US010531602B2

(12) United States Patent
Claussen et al.

(10) Patent No.: US 10,531,602 B2
(45) Date of Patent: Jan. 14, 2020

(54) IMPLEMENTS FOR DISPLACING GROUND MATERIAL

(71) Applicant: Claussen Technology, LLC, Naples, FL (US)

(72) Inventors: Steven W. Claussen, Glenwood, MN (US); Gerald B. Saude, New London, MN (US)

(73) Assignee: CLAUSSEN TECHNOLOGY, LLC, Naples, FL (US)

(*) Notice: Subject to any disclaimer, the term of this patent is extended or adjusted under 35 U.S.C. 154(b) by 0 days.

(21) Appl. No.: 15/620,065

(22) Filed: Jun. 12, 2017

(65) Prior Publication Data

US 2017/0273229 A1  Sep. 28, 2017

Related U.S. Application Data

(60) Division of application No. 15/050,201, filed on Feb. 22, 2016, now Pat. No. 9,674,996, which is a continuation-in-part of application No. 14/213,118, filed on Mar. 14, 2014, now Pat. No. 9,267,255.

(60) Provisional application No. 61/782,811, filed on Mar. 14, 2013.

(51) Int. Cl.
*A01B 35/16* (2006.01)
*A01B 39/08* (2006.01)
*E02F 3/20* (2006.01)
*E02F 3/24* (2006.01)

(52) U.S. Cl.
CPC .............. *A01B 39/08* (2013.01); *A01B 35/16* (2013.01); *E02F 3/20* (2013.01); *E02F 3/241* (2013.01)

(58) Field of Classification Search
CPC ................................ A01B 35/16; A01B 39/08

USPC .................. 172/310, 540, 548, 554; 404/132
See application file for complete search history.

(56) References Cited

U.S. PATENT DOCUMENTS

| 72,438 A | 12/1867 | Worley |
| 92,756 A | 7/1869 | Sherwood |
| 560,033 A | 5/1896 | Holzhauer |
| 895,230 A | 8/1908 | Beier |
| 948,389 A | 2/1910 | Cairns |
| 976,439 A | 11/1910 | Cunningham |
| 1,069,264 A | 8/1913 | Keller |
| 1,655,737 A | 1/1928 | Powers |
| 1,892,945 A | 1/1933 | Griebat |

(Continued)

FOREIGN PATENT DOCUMENTS

CA    1227683    10/1987

OTHER PUBLICATIONS

Lonn, "Tip and Adaptor Assembly," United States Statutory Invention Registration No. H946, published Aug. 6, 1991.

(Continued)

*Primary Examiner* — Gary S Hartmann
(74) *Attorney, Agent, or Firm* — Mueting, Raasch & Gebhardt, P.A.

(57) ABSTRACT

Implement apparatus configured to displace ground material is disclosed herein. For example, an implement includes an extension member coupled to a roller apparatus. The roller apparatus includes a cylindrical portion and a plurality of ground displacing elements. The ground displacing elements is configured to extend into a ground surface to disperse ground material when the roller apparatus is engaged with the ground surface as the vehicle traverses the ground surface.

8 Claims, 25 Drawing Sheets

(56) References Cited

U.S. PATENT DOCUMENTS

| | | | |
|---|---|---|---|
| 2,146,222 A | 2/1939 | Pace | |
| 2,228,265 A | 1/1941 | Garey | |
| 2,228,389 A | 1/1941 | Garey | |
| 2,236,832 A | 4/1941 | Nielsen | |
| 2,559,048 A | 7/1951 | Seaman | |
| 2,601,591 A | 6/1952 | Colombo | |
| 2,614,375 A | 10/1952 | Calkins | |
| 2,663,131 A * | 12/1953 | Johnson | A01B 39/18 172/554 |
| 2,749,822 A | 6/1956 | Matteoli | |
| 2,750,860 A | 6/1956 | Zanola | |
| 2,857,835 A | 10/1958 | Fitzgerald | |
| 2,881,848 A | 4/1959 | Liston | |
| 2,928,484 A * | 3/1960 | Blocker | A01B 39/08 172/549 |
| 3,245,478 A | 4/1966 | Thompson | |
| 3,436,069 A | 4/1969 | Henschen | |
| 3,596,764 A * | 8/1971 | Smith | B07B 1/46 171/6 |
| 3,832,773 A * | 9/1974 | Langford | B26B 7/005 30/277.4 |
| 3,923,103 A | 12/1975 | Davis et al. | |
| 3,941,193 A | 3/1976 | Shoemaker | |
| 4,020,906 A * | 5/1977 | Wells | A01B 29/045 111/33 |
| 4,102,406 A | 7/1978 | Orthman | |
| 4,158,392 A | 6/1979 | Belanger | |
| 4,194,575 A | 3/1980 | Whalen | |
| 4,240,510 A | 12/1980 | Morin | |
| 4,339,908 A | 7/1982 | Johnson | |
| 4,415,041 A | 11/1983 | Fackler | |
| 4,418,761 A | 12/1983 | Dietrich et al. | |
| 4,466,492 A | 8/1984 | Steinberg | |
| 4,508,177 A | 4/1985 | Wiser | |
| 4,610,567 A * | 9/1986 | Hosking | E01C 19/268 172/547 |
| 4,919,566 A | 4/1990 | Caron et al. | |
| 5,190,112 A | 3/1993 | Johnston et al. | |
| 5,253,467 A | 10/1993 | Sims, Jr. | |
| 5,355,963 A | 10/1994 | Boyko et al. | |
| 5,732,780 A * | 3/1998 | Nikkel | A01B 39/08 172/177 |
| 6,095,717 A | 8/2000 | Kaldenberg et al. | |
| 6,494,270 B1 * | 12/2002 | Lawson | A01B 35/28 172/518 |
| 6,682,262 B2 | 1/2004 | Caron et al. | |
| 6,708,777 B1 * | 3/2004 | Holmes | A01B 29/045 172/547 |
| 6,854,525 B2 * | 2/2005 | Martindale | A01B 33/103 111/121 |
| 6,872,053 B2 * | 3/2005 | Bucher | F04D 25/088 403/302 |
| 6,976,325 B2 | 12/2005 | Robinson et al. | |
| 6,991,401 B1 | 1/2006 | Caron | |
| 7,108,452 B2 | 9/2006 | Caron et al. | |
| D538,828 S | 3/2007 | Stern | |
| 7,478,684 B2 | 1/2009 | Ward | |
| 7,484,568 B2 * | 2/2009 | Vasilescu | A01B 33/103 172/122 |
| 7,730,961 B2 | 6/2010 | Ward et al. | |
| 9,267,255 B2 | 2/2016 | Claussen | |
| 9,439,339 B2 | 9/2016 | Hurd | |
| 9,674,996 B2 * | 6/2017 | Claussen | E02F 3/20 |
| 2002/0114667 A1 | 8/2002 | Kaldenberg et al. | |
| 2006/0255653 A1 | 11/2006 | Gibbins | |
| 2007/0024016 A1 | 2/2007 | Claussen et al. | |
| 2010/0139937 A1 | 6/2010 | Wright | |
| 2015/0216105 A1 * | 8/2015 | Butler | A01B 61/046 172/27 |
| 2016/0073571 A1 | 3/2016 | Hurd | |
| 2016/0168813 A1 | 6/2016 | Claussen | |

OTHER PUBLICATIONS

"1tRIPr," datasheet. Precision Tillage, Orthman Manufacturing Inc., Lexington, NE, Copyright 2006-2012. Retrieved from the Internet: http://precisiontillage.com; 4 pgs.

"Dammer Diker," datasheet. AG Engineering & Development Co., Inc., Tri-Citites, WA, Copyright 1988. Retrieved from the Internet: http://dammerdiker.com/PDFs/RowCrop.pdf; 2 pgs.

Online Information. TerraManus Technologies LLC, Salem, IN, Copyright 2014. Retrieved from the Internet: http://terramanustech.com; 14 pgs.

"Summers SuperRoller" datasheet. Summers Manufacturing Company, Inc., Devils Lake and Maddock, ND, Copyright 2011. Retrieved from the Internet: http://www.summersmfg.com/literature/SuperRoller_0912.pdf; 6 pgs.

"Tri Plex Landroller" and "Five Plex Landroller" from *Agricultural Equipment* product brochure, Degelman Industries Ltd., Regina, SK, Copyrighted. Retrieved on Apr. 28, 2014. Retrieved from the Internet: http://www.degelman.com/assets/manuals/AG%20Brochure%20web.pdf; Title page and pp. 4-7.

* cited by examiner

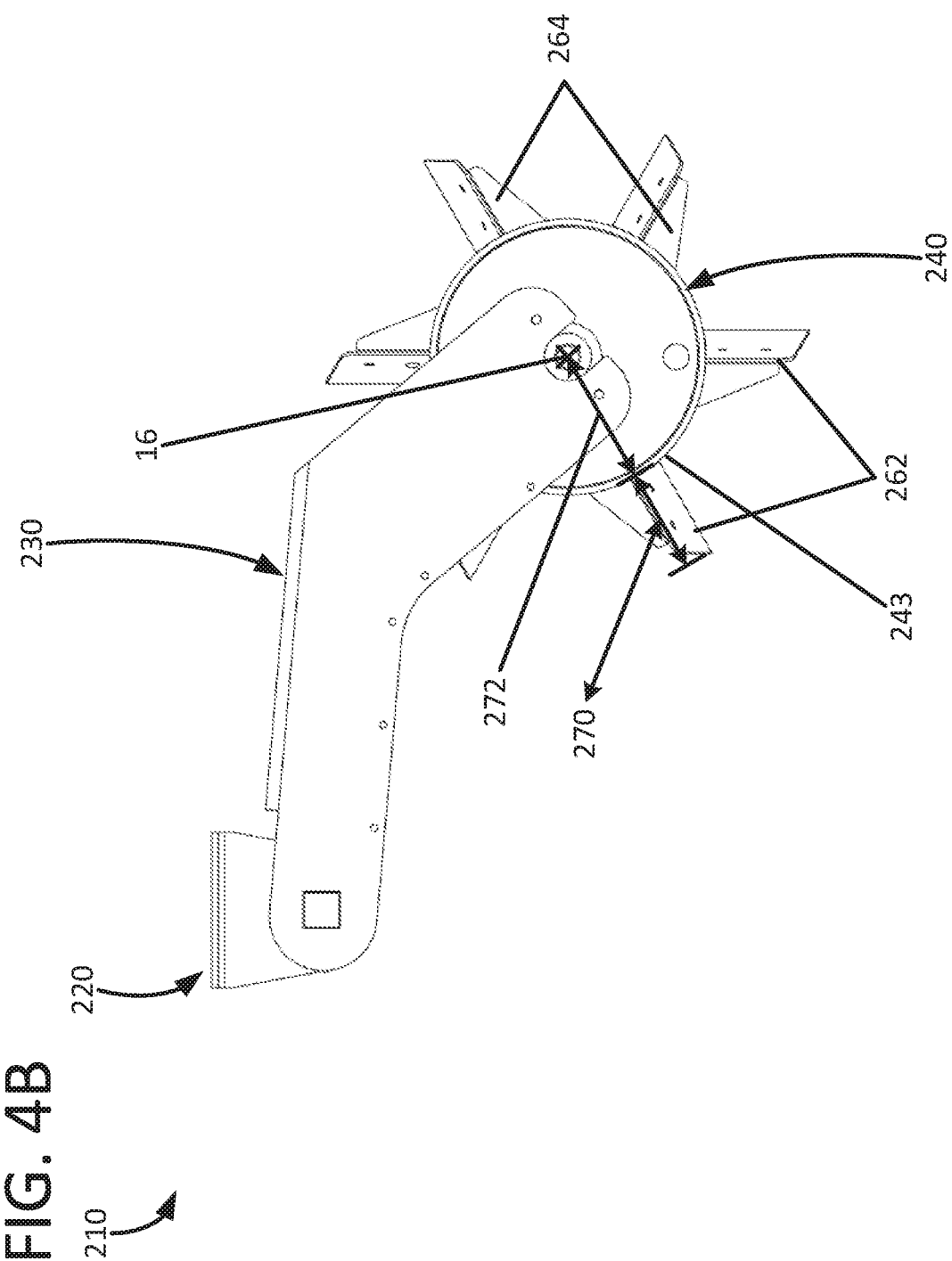

IMPLEMENTS FOR DISPLACING GROUND MATERIAL

This application is a continuation application of U.S. patent application Ser. No. 15/050,201 filed on Feb. 22, 2016, which is a continuation-in-part application of U.S. patent application Ser. No. 14/213,118 filed on Mar. 14, 2014, which claims the benefit of U.S. Provisional Patent. Application Ser. No. 61/782,811 filed on Mar. 14, 2013, each of which is incorporated by reference in their entireties.

The present disclosure relates to implements and implement systems for use in displacing ground material. The implements may include roller apparatus configured to engage a ground surface and form a plurality of reservoirs in the ground surface.

Water distributed through irrigation systems or from rain may be unevenly dispersed over an agricultural field due to runoff and further may be subject to evaporation. For example, a sloped or angled ground surface may also contribute to water runoff where water may run from higher areas of a field to lower areas of the field. Additionally, water exposed on the top of the ground surface may be subject to evaporation.

SUMMARY

The present disclosure describes exemplary implements, implement systems, and methods for use in conditioning soil. The exemplary implements and implement systems may be configured to be attached to a vehicle such as, e.g., a tractor. The vehicle may traverse a ground surface, such as a field, towing one or more implements in between planted rows of vegetation or crops such as, e.g., corn, soybeans, cotton, wheat, potatoes, sugar beets, sunflowers, and all row crops, etc., or in the preparation of land for construction. An exemplary implement may generally include roller apparatus and an extension member configured to hold, or position, the roller apparatus such that it may engage the ground surface to form a plurality of reservoirs in the ground surface. For example, the extension member may be configured to apply down pressure to the roller apparatus such that the roller apparatus continuously engages the ground surface when in use. The extension member may be pivotably attached to a mount portion, which may be configured to be attached to the vehicle.

One or more implements may be part of an exemplary system. For example, a plurality of implements, as described herein, may be part of an exemplary implement system. An exemplary system may generally include a frame apparatus (such as, e.g., a beam or other structure) for supporting the plurality of implements and coupling them to the vehicle. Each mount portion of the plurality of implements may be configured to mount or couple each implement to the frame apparatus. In the exemplary system, the plurality of implements may be coupled to the frame apparatus in a spaced apart arrangement along the frame apparatus to facilitate each of the plurality of implements passing between rows of crops.

One exemplary implement couplable to a vehicle configured to traverse a ground surface may include a mount portion couplable to a vehicle, an extension member extending from a proximal end portion to a distal end portion (e.g., wherein the proximal end portion is pivotably coupled to the mount portion about a pivot axis), and a roller apparatus rotatably coupled to the distal end portion of the extension member about a roller axis. For example, the roller apparatus may include a cylindrical portion lying along the roller axis configured to roll over a ground surface (e.g., wherein the cylindrical portion may define an outer surface configured to engage the ground surface when the cylindrical portion is rolled over the ground surface) and a plurality of ground displacing elements coupled to the cylindrical portion and extending from the outer surface of the cylindrical portion (e.g., wherein each ground displacing element of the plurality of ground displacing elements may include a ground lifting surface configured to engage and lift ground material to disperse the ground material and form a plurality of reservoirs in the ground surface when the outer surface is engaged with the ground surface as the cylindrical portion is rolled over the ground surface). The mount portion may be configured to transmit force to the roller apparatus to maintain engagement between the outer surface of the cylindrical portion and the ground surface when the cylindrical portion is rolled over the ground surface.

The implement, implement systems, and/or methods described herein may include one or more of the following features: the ground lifting surface of at least one of the plurality of ground displacing elements may be a planar surface; the ground lifting surface of at least one the plurality of ground displacing elements may be a non-planar surface; the roller apparatus may be configured to contact the ground continuously, at least one ground displacing element of the plurality of ground displacing elements may extend from a first edge to a second edge defining an element width and may extend from the outer surface of the cylindrical portion to a distal edge defining an element length (e.g., the element width may be greater than the element length); a radius of the cylindrical portion may be perpendicular to the roller axis and may extend from the roller axis to the outer surface of the cylindrical portion and at least one ground displacing element of the plurality of ground displacing elements may extend from the outer surface of the cylindrical portion to a distal edge defining an element length (e.g., the element length may be greater than the radius of the cylindrical portion); the cylindrical portion may extend from a first end to a second end along the roller axis defining a roller width and the plurality of ground displacing elements may be configured to disperse ground material outside of the roller width; the plurality of ground displacing elements may be equally spaced around the cylindrical portion; each ground displacing element of the plurality of ground displacing elements may extend from the outer surface of the cylindrical portion along a plane that is tangential to the cylindrical portion; the plurality of ground displacing elements may include at least four ground displacing elements; at least one ground displacing element of the plurality of ground displacing elements may extend from a first edge to a second edge defining an element width and the cylindrical portion may extend from a first end to a second end along the roller axis defining a roller width (e.g., the element width may be greater than 50% of the cylindrical portion width); at least one ground displacing element of the plurality of ground displacing elements may extend from a first edge to a second edge defining an element width and the cylindrical portion may extend from a first end to a second end along the roller axis defining a roller width (e.g., the element width may be greater than 90% of the cylindrical portion width); the mount portion may include an elongated torsion assembly extending along the pivot axis (e.g., the elongated torsion assembly may include a first elongate member fixedly coupled to the mount portion, a second elongate member fixedly coupled to the extension member, and a plurality of cushioning rods located between the first and second elongate members and configured to allow movement of the first elongate member relative to the second elongate member about the pivot axis); the cylindrical portion may define an enclosure configured to contain material (e.g., water) to provide additional mass to the roller apparatus; at least one ground displacing element of the plurality of ground displacing elements may include a first portion extending along a first plane and a second portion extending along a second plane, wherein the first plane and the second plane intersect at an apex; at least one ground displacing element of the plurality of the ground displacing elements may further define a rear surface opposite the ground lifting surface, an element thickness may be defined between the rear surface and the ground lifting surface, and the ground displacing element of the plurality of ground displacing elements may extend from a first edge to a second edge defining an element width (e.g., the element width may be greater than the element thickness); at least one ground displacing element of the plurality of ground displacing elements may define one or more apertures extending through the ground lifting surface to allow ground material to pass through the ground displacing element; and/or at least one ground displacing element of the plurality of ground displacing elements may include a blade portion and one or more attachment portions fixedly coupled to the cylindrical portion (e.g., the blade portion may be removably coupled to the one or more attachment portions).

An exemplary implement system couplable to a vehicle configured to traverse a ground surface may include frame apparatus couplable to the vehicle and a plurality of implements coupled to the frame apparatus. The plurality of implements may include a mount portion couplable to a vehicle, an extension member extending from a proximal end portion to a distal end portion (e.g., wherein the proximal end portion may be pivotably coupled to the mount portion about a pivot axis), and a roller apparatus rotatably coupled to the distal end portion of the extension member about a roller axis. The roller apparatus may include a cylindrical portion lying along the roller axis configured and sized to roll over a ground surface between crop rows (e.g., the cylindrical portion may define an outer surface configured to engage the ground surface when the cylindrical portion is rolled over the ground surface) and a plurality of ground displacing elements coupled to the cylindrical portion and extending from the outer surface of the cylindrical portion. The mount portion may be configured to transmit force to the roller apparatus to maintain engagement between the outer surface of the cylindrical portion and the ground surface when the cylindrical portion is rolled over the ground surface.

In one or more embodiments of the system, at least one ground displacing element of the plurality of ground displacing elements may include a ground lifting surface configured to engage and lift ground material to disperse the ground material and form a plurality of reservoirs in the ground surface when the outer surface is engaged with the ground surface while the cylindrical portion is rolled over the ground surface.

In one or more other embodiments of the system, at least one ground displacing element of the plurality of ground displacing elements may be configured to engage and compress the ground material (e.g., compression elements) to disperse the ground material and form a plurality of reservoirs in the ground surface when the outer surface is engaged with the ground surface while the cylindrical portion is rolled over the ground surface. For example, the cylindrical portion may define a plurality of keyhole-shaped openings and each of the plurality of ground displacing elements (e.g., compression elements) may be removably coupled to the cylindrical portion using a keyhole-shaped opening of the plurality of keyhole-shaped openings. Further, for example, each of the plurality of ground displacing elements (e.g., compression elements) may define an opening extending therethrough and the roller apparatus may include a plurality of fasteners (e.g., wherein each fastener of the plurality of fasteners may be configured to extend through the opening of a ground displacing element and through a keyhole-shaped opening of the cylindrical portion to removably couple the ground displacing element to the cylindrical portion). In one or more embodiments, each keyhole-shaped opening of the plurality of keyhole-shaped openings may define a slot region and a circular region, a diameter of the circular region may be larger than a width of the slot region, the cylindrical portion may define a plurality of secondary openings, and/or each ground displacing element of the plurality of ground displacing elements may include a retention portion configured to be located in one of the secondary openings of the cylindrical portion when the ground displacing element is removably coupled to the cylindrical portion using a keyhole-shaped opening to retain the fastener in the slot region of the keyhole-shaped opening. In one or more embodiments, a single roller apparatus may be used with a vehicle (e.g., the single roller apparatus may include compression elements as described herein).

An exemplary method of using an implement may include coupling an implement to a vehicle. The implement may include a mount portion couplable to a vehicle, an extension member extending from a proximal end portion to a distal end portion (e.g., wherein the proximal end portion may be pivotably coupled to the mount portion about a pivot axis), and a roller apparatus rotatably coupled to the distal end portion of the extension member about a roller axis. The roller apparatus may include a cylindrical portion lying along the roller axis configured to roll over a ground surface and the cylindrical portion may define an outer surface configured to engage the ground surface when the cylindrical portion is rolled over the ground surface and a plurality of ground displacing elements coupled to the cylindrical portion and extending from the outer surface of the cylindrical portion (e.g., each ground displacing element of the plurality of ground displacing elements may include a ground lifting surface configured to engage and lift ground material to disperse the ground material and form a plurality of reservoirs in the ground surface when the outer surface is engaged with the ground surface while the cylindrical portion is rolled over the ground surface). The mount portion may be configured to transmit force to the roller apparatus to maintain engagement between the outer surface of the cylindrical portion and the ground surface when the cylindrical portion is rolled over the ground surface. The method may further include engaging the ground surface with the roller apparatus of the implement and traversing the ground surface with the vehicle and the implement.

One exemplary implement apparatus may be couplable to a vehicle configured to traverse a ground surface. The exemplary implement apparatus may include an extension member couplable to the vehicle and extending from a proximal end portion to a distal end portion and a roller apparatus rotatably coupled to the distal end portion of the extension member. The roller apparatus may be configured to engage the ground surface when the vehicle traverses the ground surface. Further, the roller apparatus may include a cylindrical portion defining an outer cylindrical surface and lying along a roller axis configured to rotate as the vehicle traverses the ground surface and a plurality of ground displacing elements coupled to the cylindrical portion and extending from the outer cylindrical surface of the cylindrical portion. Each ground displacing element of the plurality of ground displacing elements may define a chisel edge and may be configured to extend into the ground surface to displace ground material when the roller apparatus is engaged with the ground surface as the vehicle traverses the ground surface. The chisel edge may engage the ground surface prior to the remainder of the ground displacing element when the roller apparatus is engaged with the ground surface as the vehicle traverses the ground surface.

In one or more embodiments, at least one ground displacing element of the plurality of ground displacing elements may include a first portion extending along a first plane, and a second portion extending along a second plane. Further, the first plane and the second plane may intersect at an apex defining the chisel edge.

In one or more embodiments, at least one ground displacing element of the plurality of ground displacing elements may be removably coupled to the cylindrical portion. In one or more embodiments, the plurality of ground displacing elements may be arranged in at least three rows circumferentially extending around the outer cylindrical surface of the cylindrical portion. In one or more embodiments, the plurality of ground displacing elements may be arranged in at least a first row and second row, each of the first and second rows extending circumferentially around the outer cylindrical surface of the cylindrical portion, and the plurality of ground displacing elements located in the first row may be staggered with respect to the plurality of ground displacing elements located in the second row such that the plurality of ground displacing elements located in the first row do not extend from the same locations about the circumference of the cylindrical portion as the plurality of ground displacing elements located in the second row.

In one or more embodiments, the plurality of ground displacing elements may include eight or more ground displacing elements. In one or more embodiments, the cylindrical portion may define an enclosure configured to contain material to provide additional mass to the roller apparatus.

In one or more embodiments, a radius of the cylindrical portion perpendicular to the roller axis extends from the roller axis to the outer cylindrical surface, at least one ground displacing element of the plurality of ground displacing elements extends from the outer cylindrical surface to a distal edge defining an element length, and the element length is greater than the radius of the cylindrical portion.

One exemplary implement apparatus may be couplable to a vehicle configured to traverse a ground surface and the exemplary implement apparatus may include a mount portion couplable to the vehicle, an extension member extending from a proximal end portion coupled to the mount portion to a distal end portion, and a roller apparatus rotatably coupled to the distal end portion of the extension member. The roller apparatus may be configured to engage the ground surface when the vehicle traverses the ground surface and may include a cylindrical portion lying along a roller axis and configured to rotate as the vehicle traverses the ground surface, and a plurality of ground displacing elements coupled to the cylindrical portion and extending from the outer cylindrical surface of the cylindrical portion. Each ground displacing element of the plurality of ground displacing elements may include an attachment portion removably coupled to the outer cylindrical surface of the cylindrical portion, and a blade portion coupled to the attachment portion and configured to extend into the ground surface to displace ground material when the roller apparatus is engaged with the ground surface as the vehicle traverses the ground surface.

In one or more embodiments, the cylindrical portion may define a plurality of keyhole-shaped openings through the outer cylindrical surface, and the attachment portion of each of the plurality of ground displacing elements may be removably coupled to the cylindrical portion using a keyhole-shaped opening of the plurality of keyhole-shaped openings. Further, the attachment portion of each of the plurality of ground displacing elements may define an opening extending therethrough, and the roller apparatus may include a plurality of fasteners. Each fastener of the plurality of fasteners may be configured to extend through the opening of the attachment portion of a ground displacing element and through a keyhole-shaped opening of the cylindrical portion to couple the ground displacing element to the cylindrical portion. Still further, the cylindrical portion may define a plurality of secondary openings through the outer cylindrical surface, and the attachment portion of each ground displacing element of the plurality of ground displacing elements may include a retention portion configured to be located in one of the secondary openings of the cylindrical portion when the ground displacing element is removably coupled to the cylindrical portion using a keyhole-shaped opening to retain the fastener in a slot region of the keyhole-shaped opening.

In one or more embodiments, the blade portion of the plurality of ground displacing elements may include a first portion extending along a first plane and a second portion extending along a second plane. Further, the first plane and the second plane may intersect at an apex, and the apex may be described as entering the ground surface prior to the remainder of the blade portion when the roller apparatus is engaged with the ground surface as the vehicle traverses the ground surface.

One exemplary system couplable to a vehicle configured to traverse a ground surface may include frame apparatus couplable to the vehicle and a plurality of implements coupled to the frame apparatus. Each of the plurality of implements may include an extension member extending from a proximal end portion coupled to the frame apparatus to a distal end portion, and a roller apparatus rotatably coupled to the distal end portion of the extension member. The roller apparatus may include a cylindrical portion defining an outer cylindrical surface and lying along a roller axis configured and sized to roll between crop rows. The cylindrical portion may define a plurality of keyhole-shaped openings extending through the outer cylindrical surface. The roller apparatus may further include a plurality of ground displacing elements removably coupled to the cylindrical portion using the plurality of keyhole-shaped openings and extending from the outer cylindrical surface of the cylindrical portion. Further, the plurality of ground displacing elements may extend into the ground surface to displace ground material when the roller apparatus is engaged with the ground surface as the vehicle traverses the ground surface.

In one or more embodiments, each of the plurality of ground displacing elements may define an opening extending therethrough, and the roller apparatus may include a plurality of fasteners. Each fastener of the plurality of fasteners may be configured to extend through the opening of a ground displacing element and through a keyhole-shaped opening of the cylindrical portion to removably couple the ground displacing element to the cylindrical portion.

One exemplary implement apparatus couplable to a vehicle configured to traverse a ground surface may include an extension member couplable to the vehicle and extending from a proximal end portion to a distal end portion and a roller apparatus rotatably coupled to the distal end portion of the extension member and configured to engage the ground surface when the vehicle traverses the ground surface. The roller apparatus may include a cylindrical portion and a plurality of ground displacing elements. The cylindrical portion may define an outer cylindrical surface and lie along a roller axis configured to rotate as the vehicle traverses the ground surface. The plurality of ground displacing elements may be coupled to the cylindrical portion and extend from the outer cylindrical surface of the cylindrical portion. The plurality of ground displacing elements may be arranged in at least one row circumferentially extending around the outer cylindrical surface of the cylindrical portion, and each ground displacing element of the plurality of ground displacing elements may define a chisel edge and may be configured to extend into the ground surface to displace ground material when the roller apparatus is engaged with the ground surface as the vehicle traverses the ground surface.

Another exemplary implement apparatus couplable to a vehicle configured to traverse a ground surface may include a mount portion couplable to the vehicle, an extension member extending from a proximal end portion coupled to the mount portion to a distal end portion, and a roller apparatus rotatably coupled to the distal end portion of the extension member. The roller apparatus may be configured to engage the ground surface when the vehicle traverses the ground surface and may include a cylindrical portion and a plurality of ground displacing elements. The cylindrical portion may lie along a roller axis and may be configured to rotate as the vehicle traverses the ground surface. The plurality of ground displacing elements may be coupled to the cylindrical portion and may extend from the outer cylindrical surface of the cylindrical portion. Each ground displacing element of the plurality of ground displacing elements may include an attachment portion coupled to the outer cylindrical surface of the cylindrical portion, and a blade portion coupled to and extending from the attachment portion and configured to extend into the ground surface to displace ground material when the roller apparatus is engaged with the ground surface as the vehicle traverses the ground surface. The blade portion may lie in plane that is not perpendicular to the rolling axis.

In one or more embodiments, at least one ground displacing element of the plurality of ground displacing elements may define a forward edge and a rearward edge opposite the forward edge, and each of the forward edge and the rearward edge define the chisel edge. In one or more embodiments, at least one ground displacing element of the plurality of ground displacing elements may define a forward edge and a rearward edge opposite the forward edge, and the rearward edge may be curved (e.g., extend along a curve). In at least one embodiment, at least a portion of the forward edge may extend linearly along a line. In one or more embodiments, the plurality of ground displacing elements may be arranged at least one or two rows circumferentially extending around the outer cylindrical surface of the cylindrical portion.

In one or more embodiments, the plurality of ground displacing elements may be arranged in at least a first row and second row, and each of the first and second rows extending circumferentially around the outer cylindrical surface of the cylindrical portion. Further, the plurality of ground displacing elements may be located in the first row are staggered with respect to the plurality of ground displacing elements located in the second row such that the plurality of ground displacing elements located in the first row do not extend from the same locations about the circumference of the cylindrical portion as the plurality of ground displacing elements located in the second row.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIG. 4B is a side view of the implement of FIG. 4A.

DETAILED DESCRIPTION OF EXEMPLARY EMBODIMENTS

In the following detailed description of illustrative embodiments, reference is made to the accompanying figures of the drawings which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus, systems, and methods shall be described with reference to FIGS. 1-9. It will be apparent to one skilled in the art that elements from one embodiment may be used in combination with elements of the other embodiments, and that the possible embodiments of such apparatus, systems, and methods using combinations of features set forth herein is not limited to the specific embodiments shown in the figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

Exemplary implements, implement systems, and methods described herein may be configured to engage a ground surface and form a plurality reservoirs in the ground surface. The exemplary implements may include roller apparatus, and the roller apparatus may include a plurality of ground displacing elements shaped, sized, and/or configured in many different ways which will be described herein with respect to FIGS. 1-9.

As used herein, a "reservoir" may be defined as an indentation, recess, and/or cavity formed within a ground surface configured such that water may be collected and/or held therein.

Figure 1A:
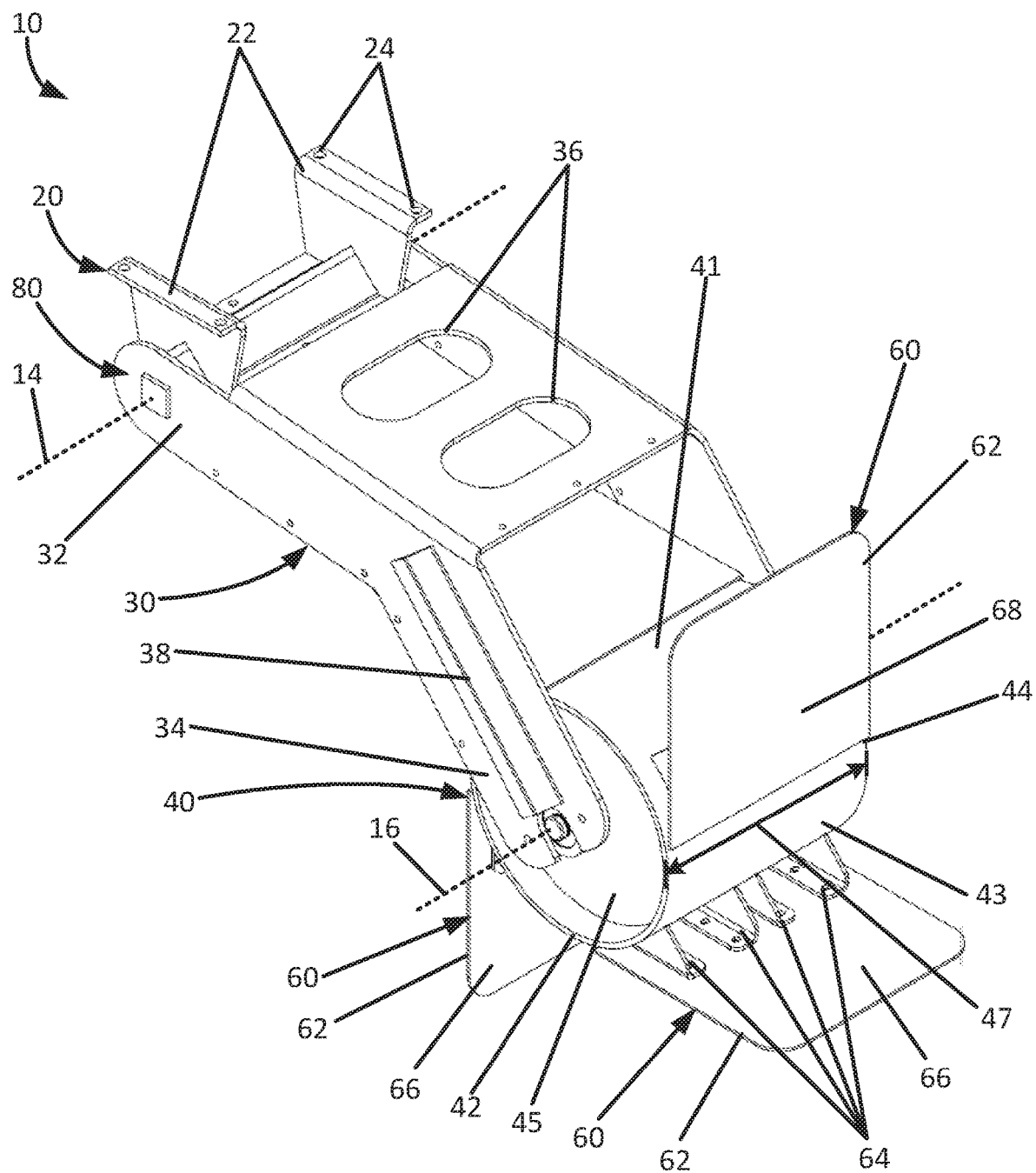
FIG. 1A is a perspective view of an exemplary implement.
Figure 1B:
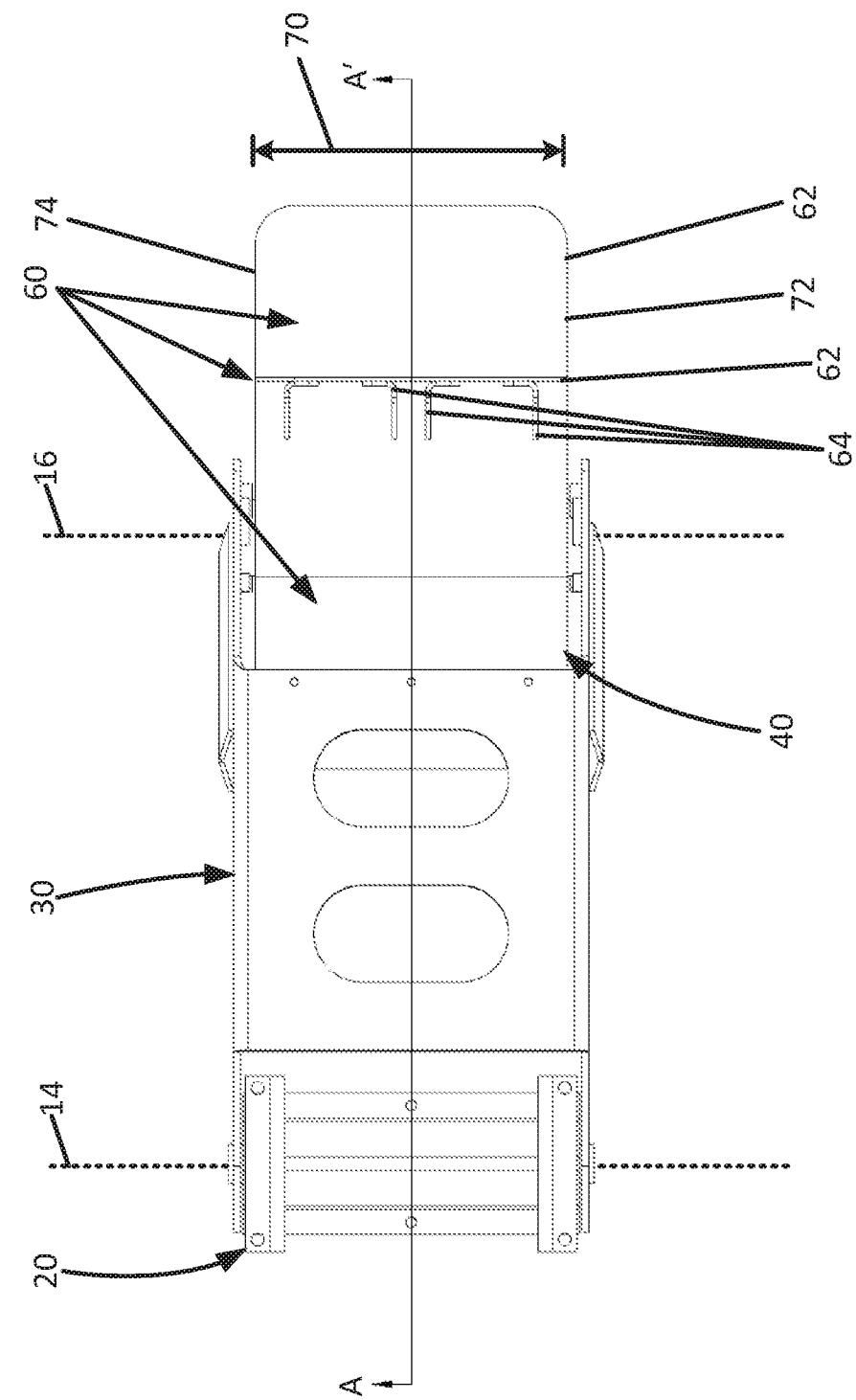
FIG. 1B is a top view of the implement of FIG. 1A.
Figure 1C:
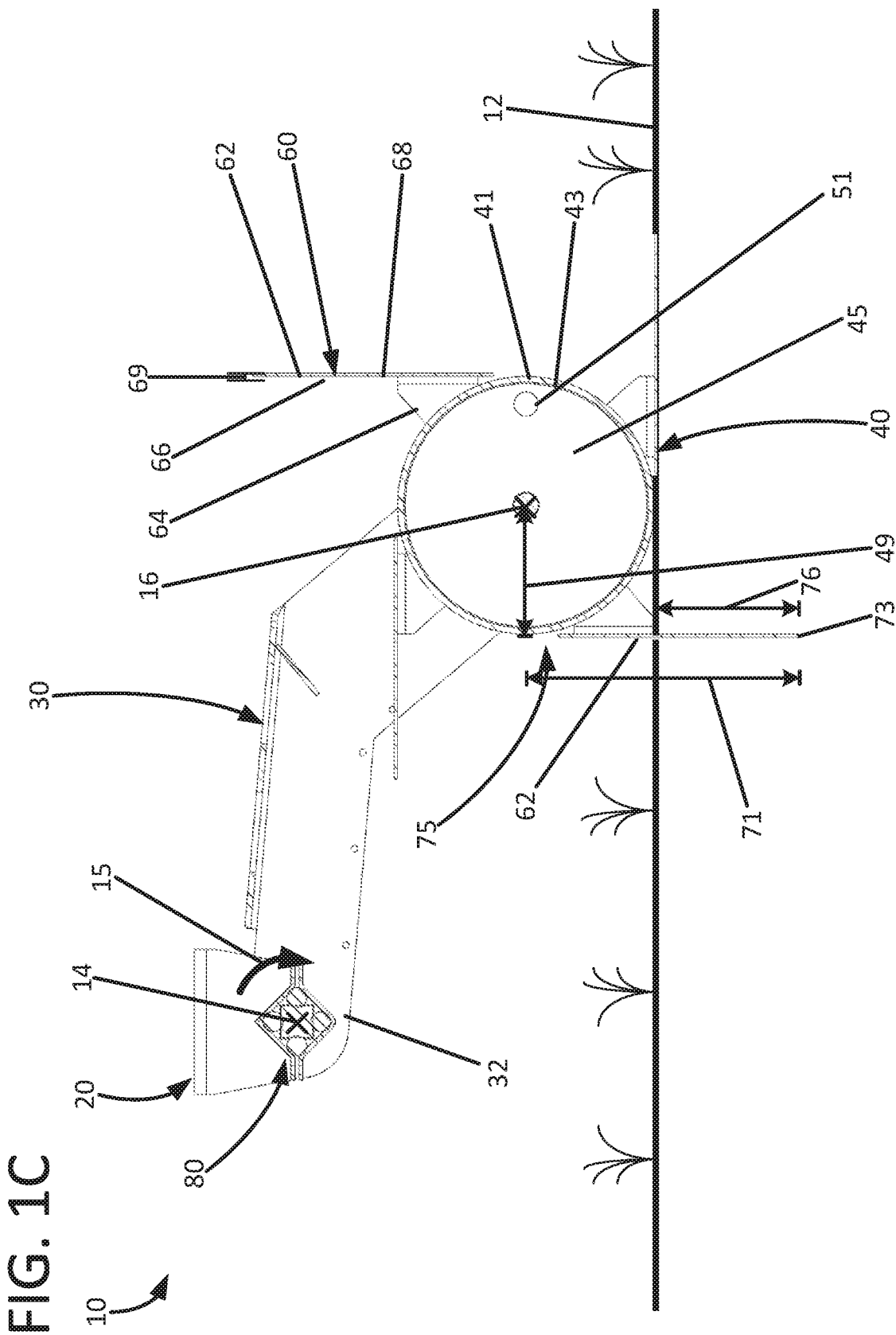
FIG. 1C is a cross sectional view of the implement of FIG. 1A taken along line A-A' as shown in FIG. 1B.
Figure 1D:
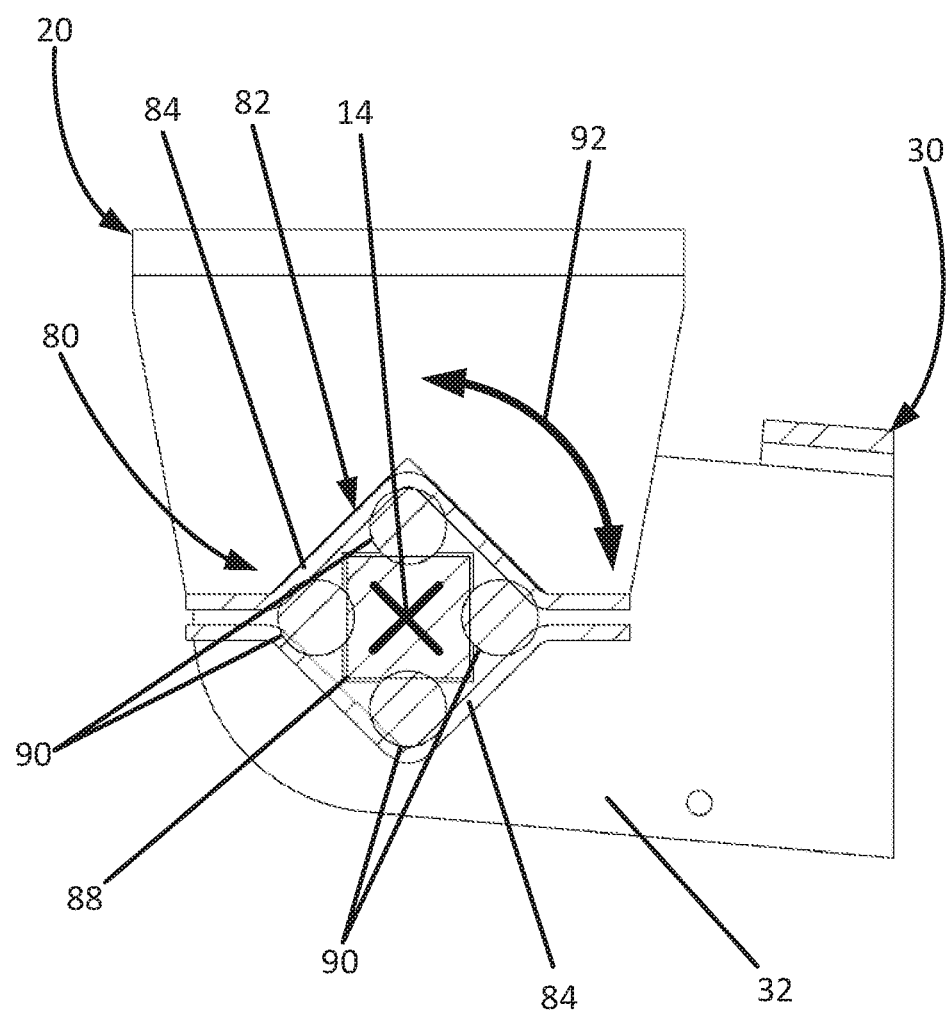
FIG. 1D is an enlarged view of the elongate torsion assembly of FIG. 1C.

An exemplary implement 10 depicted in FIGS. 1A-1C may include a mount portion 20, an extension member 30, and a roller apparatus 40. The mount portion 20 may be configured to be coupled to a vehicle (not shown), such as a tractor, to couple the exemplary implement 10 to the vehicle. The vehicle may be used to pull the implement between rows of vegetation or crops to form a plurality of reservoirs between the rows using the implement 10. To provide the coupling between the implement 10 and a vehicle, the mount portion 20 may include one or more mounting brackets 22 configured to be coupled, or attached, to a portion of a vehicle. As shown, the mounting brackets 22 may define a plurality of apertures, or openings, 24 through which fasteners, such as bolts, may extend to couple the brackets 22 to the vehicle.

The mount portion 20 may not be directly coupled to a vehicle, and instead, may be coupled to apparatus that is coupled to the vehicle. For example, the mount portion 20 may be coupled to frame apparatus, such as, e.g., a beam, or other support member, which may be coupled to the vehicle, such as described herein with respect to FIG. 8. In one or more embodiments, exemplary frame apparatus may be raised or lowered by the vehicle so as to raise or lower the implement 10 to engage a ground surface. For example, the mount portion 20 may be couplable to and/or coupled to a frame apparatus that extends transverse to the forward moving direction of a vehicle and the frame apparatus may be coupled to a hydraulic system of the vehicle to raise and lower the implement 10 when used in conjunction with the vehicle.

The mount portion 20 may be configured to transmit force to the roller apparatus 40 from the vehicle to maintain engagement between the roller apparatus 40 and a ground surface 12 when the roller apparatus 40 is rolled over the ground surface 12 as shown in FIG. 1C. For example, the vehicle may provide a force, or may allow the mass of the implement 10 itself to provide a force, to direct the roller apparatus 40 in engagement with the ground surface 12 when in use, and the mount portion 20 may facilitate, or transmit, that force to the roller apparatus 40. Additionally, the mount portion 20 may be configured to transmit force to the roller apparatus 40 by being biased in a clockwise direction about a pivot axis 14 as shown by arrow 15 when viewing the implement 10 from the side as shown in FIG. 1C. Other methods of transmitting force to the roller apparatus 40 may be used such as, e.g., airbags, a bellows suspension system, a torsional spring system, a linear spring actuator system, or a rotary or linear hydraulic actuator/accumulator system, etc.

The extension member 30 may extend from a proximal end portion 32 to a distal end portion 34 and may be pivotally coupled to the mount portion about the pivot axis 14. As used herein, "pivotally coupled" may be defined as a coupling between objects such that the objects are configured for pivotal movement in relation to each other. As depicted, the mount portion 20 may be pivotally coupled to the proximal end portion 32 of the extension member 30 through the use of an elongate torsion assembly 80 (see, e.g., a "Henschen" suspension as described in U.S. Pat. No. 3,436,069 entitled "Bearing Assembly for Elastic Joints" and issued to Henschen on Apr. 1, 1969 and U.S. Pat. App. Pub. No. 2007/0024016 A1 entitled "Parallel Torsion Suspension Assembly" published on Feb. 1, 2007, each of which are hereby incorporated by reference in their entireties), which is shown in more detail in FIG. 1D.

The elongate torsion assembly 80 may extend along the pivot axis 14 and be configured to provide down pressure, or downward force, to the roller apparatus 40. The elongate torsion assembly 80 may also act as a suspension, by limiting travel and damping movement and vibrations, when the roller apparatus 40 of the implement 10 is rolled across a ground surface 12. The elongated torsion assembly 80 may include a first elongate member 82 fixedly coupled to the mount portion 20, and a second elongate member 88 fixedly coupled to the extension member 30. The first elongate member 82 may include an upper portion 84 and a lower portion 86 configured to be coupled together to "sandwich" the second elongate member 88 therebetween. The elongate torsion assembly 80 may further include a plurality of cushioning rods 90 located between the first and second elongate members 82, 88. The cushioning rods 90 may be configured to allow movement of the first elongate member 82 relative to the second elongate member 88 about the pivot axis 14 in either direction as indicated by arrow 92. As such, the elongated torsion assembly 80 may be configured to allow movement of the mount portion 20 relative to extension member 30, and vice versa, about the pivot axis 14 in either direction as indicated by arrow 92.

In other words, the elongated torsion assembly 80 may include two elongate members, a first elongate member 82 and a second elongate member 88, which may be of similar length, but may differ in cross section size or shape such that the first and second elongate members 82, 88 may be generally concentrically arranged about the pivot axis 14 with shock absorbing and/or travel limiting cushioning rods 90 (a rod of any suitable shape may be used) located therebetween. In some embodiments, the first elongate member 82 may reside or may be located within the second elongate member 88 as opposed to the second elongate member 88 residing or located within the first elongate member 82.

In at least one embodiment, the cushioning rods 90 may extend the full length of the first elongate member 82 and the second elongate member 88. In other embodiments the cushioning rods 90 may be formed in segments and or pieces and may be located at the end regions of elongate members 82 and 88. In some embodiments, the cushioning rods 90 may extend greater than or equal to 40% of the length of the first and second elongate members 82, 88, greater than or equal to 50% of the length of the first and second elongate members 82, 88, greater than or equal to 75% of the length of the first and second elongate members 82, 88, or greater than or equal to 90% of the length of the first and second elongate members 82, 88. Additionally, the cushioning rods 90 may extend less than or equal to 100% of the length of the first and second elongate members 82, 88, less than or equal to 90% of the length of the first and second elongate members 82, 88, less than or equal to 75% of the length of the first and second elongate members 82, 88, or less than or equal to 50% of the length of the first and second elongate members 82, 88.

Figure 5A:
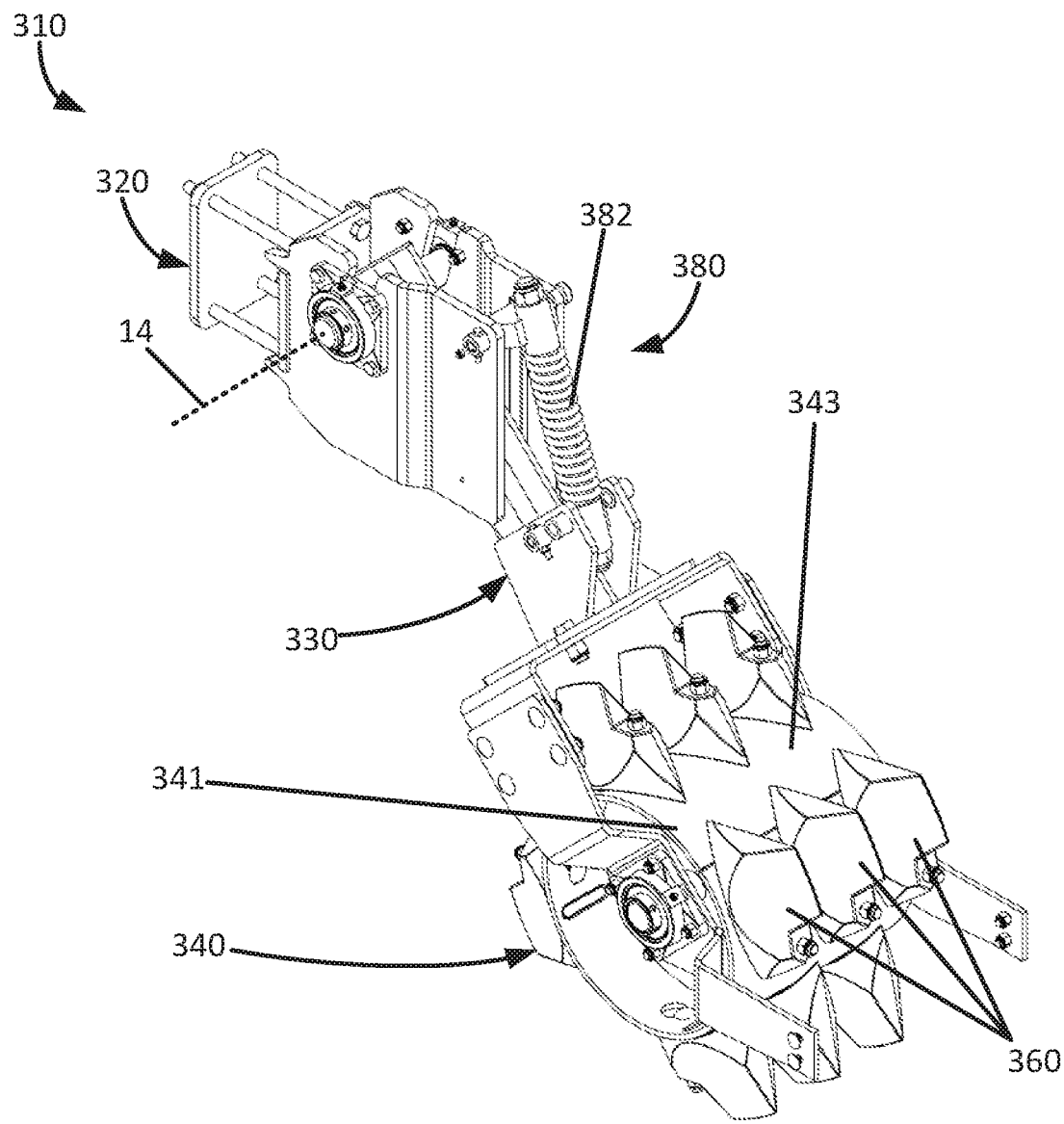
FIG. 5A is a perspective view of another exemplary implement.
Figure 5B:
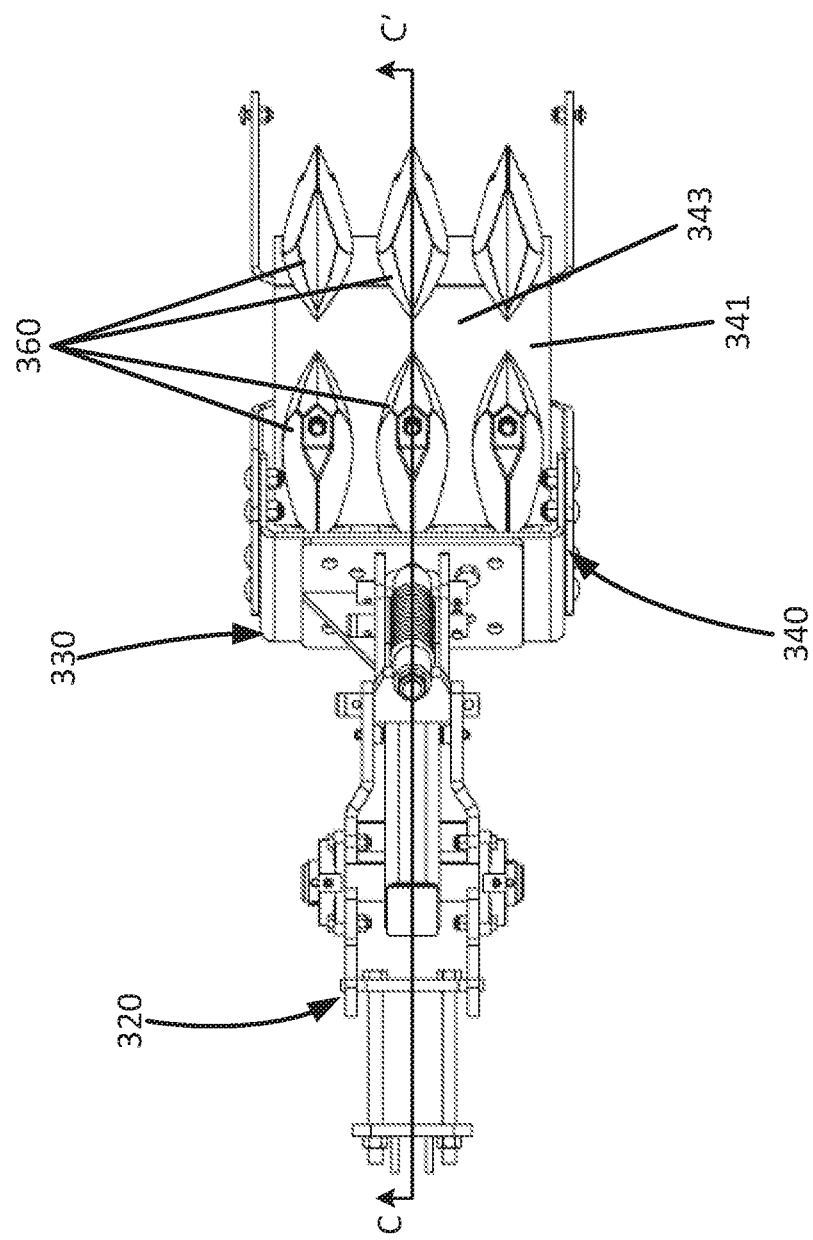
FIG. 5B is a top view of the implement of FIG. 5A.
Figure 5C:
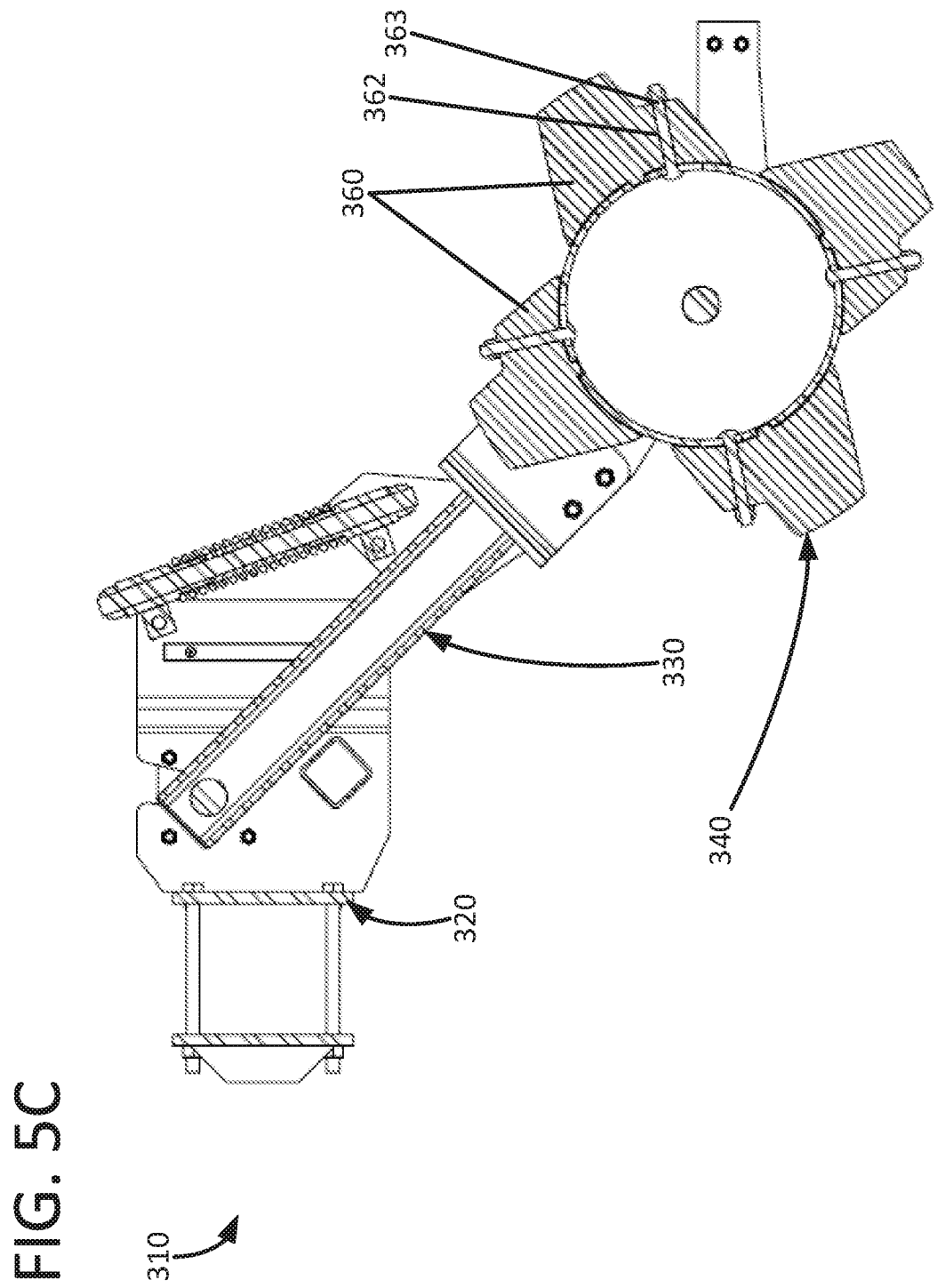
FIG. 5C is a cross sectional view of the implement of FIG. 5A taken along line C-C' as shown in FIG. 5B.

In other embodiments, such as depicted in FIGS. 5A-5C, the mount portion may be pivotally coupled to the proximal end portion of the extension member through the use of, for example, a spring, a strut, a shock absorber, a linear spring/damper system, a rotary or linear hydraulic actuator/accumulator system or any suitable suspension element or system or combination of such elements or systems, etc.

The extension member 30 may be made, or formed of, metal such as steel, aluminum, cast iron, plastic (e.g., for example, fiber-reinforced or glass-filled) or any other suitable material. Further, the extension member 30 may be formed by cutting (e.g., laser cutting, stamping, blanking, water-jet cutting, or plasma cutting, etc.) a sheet of material and then bending, or forming, the sheet of material into the shape depicted in FIGS. 1A-1C. Additionally, the extension member 30 may be formed using any suitable method including casting, forging or injection molding. As shown, one or more cutouts 36 may be defined, or formed, in the extension member 30 to, e.g., reduce weight, provide access points for serviceability, provide debris cleanout and/or flow-through for debris, etc.

Further, as shown in FIG. 1A, the extension member 30 may include one or more stiffening members 38 to, e.g., reinforce the strength of the extension member 30. The stiffening members 38 may be formed by coupling (e.g., by welding, riveting or otherwise fastening process) reinforcement material to the extension member 30, or by the creation of stiffening features within the extension member 30. The stiffening members 38 may restrict bending, twisting or other undesirable deformation of the extension member 30 from occurring. The distal end portion 34 of the extension member may extend towards the ground surface 12 (e.g., the distal end portion 34 may be angled towards a ground surface 12, etc., as shown in FIG. 1C) and may be coupled to the roller apparatus 40 to locate the roller apparatus 40 proximate the ground surface 12 such that the roller apparatus 40 may engage and contact the ground 12 (e.g., for example, continuously, to ensure that the roller apparatus 40 outer surface 43 of the cylindrical portion 41 maintains contact with the ground surface 12 and does not bounce off the ground surface 12, or intermittently, so that the roller apparatus 40 or the outer surface 43 of the cylindrical portion 41 maintains contact with the ground surface 12 at least a portion of the time) when in use.

The roller apparatus 40 may be configured to engage and lift ground material to disperse the ground material and form a plurality of reservoirs in the ground surface 12 as the implement 10 traverses the ground surface 12. As the roller apparatus 40 traverses the ground surface 12, the roller apparatus 40 may roll over the ground surface 12. To facilitate the rotational motion of the roller apparatus 40, the roller apparatus 40 may be rotatably coupled to the distal end portion 34 of the extension member 30 about a roller axis 16. As used herein, "rotatably coupled" may be defined as a coupling between objects such that the objects are rotatable in relation to each other.

The roller apparatus 40 may include a cylindrical portion 41 defining an outer surface 43 and a plurality of ground displacing elements 60 (e.g., soil displacing elements). The cylindrical portion 41 may extend from a first end portion 42 to a second end portion 44 defining a roller width 47. The roller width 47 (e.g., for example, a roller width sized to be positioned between crop rows) may be about 8 inches to about 42 inches, such as, e.g., about 8 inches, about 12 inches, about 21 inches, about 22 inches, about 24 inches, about 42 inches, or any size in between those described herein, but not limited thereto, etc., and may be dependent on the distance between crop rows for which the implement is intended to be used. Each of the first end portion 42 and the second end portion 44 may be rotatably coupled to the extension member 30 about the roller axis 16 such that the roller apparatus 40 is rotatably coupled to the extension member 30.

The plurality of ground displacing elements 60 may be coupled to the cylindrical portion 41 and extend outwardly from the outer surface 43 of the cylindrical portion 41. The plurality of ground displacing elements 60 may be configured to extend into the ground, or beyond the ground surface 12, to engage and lift ground material when the outer surface 43 of the cylindrical portion 41 is engaged with the ground surface 12 as the roller apparatus 40 and portions thereof such as the cylindrical portion 41 are rolled over the ground surface 12. After the ground material is lifted by the ground displacing elements 60, the ground displacing elements 60 may disperse the ground material. In one or more embodiments, the ground material may dispersed to the sides of the roller apparatus 40, e.g., direction traverse to the forward moving motion of the vehicle.

As noted, the outer surface 43 of the cylindrical portion 41 may be configured to engage the ground surface 12 when the cylindrical portion 41 is rolled over the ground surface 12 as shown in FIG. 1C. As used herein, "engage a ground surface" may be defined as touching, or contacting, the ground surface 12 while the object is in use. For example, when the outer surface 43 of the cylindrical portion 41 of the roller apparatus 40 engages the ground surface 12, at least a portion of the outer surface 43 may touch, or be in contact, with the ground surface 12 at least a portion of the time when in use. Further, in one embodiment, the exemplary implement 10 may be configured such that the outer surface 43 of the cylindrical portion 41 engages, or contacts, the ground continuously or intermittently when in use (e.g., the suspension apparatus coupling the mount portion 20 to the extension member 30 may transmit force to the roller apparatus 40 to provide continuous or intermittent engagement between the outer surface 43 of the cylindrical portion 41 and the ground surface 12).

The cylindrical portion 41 of the roller apparatus 40 may define an enclosure (e.g., a hollow drum). For example, in some embodiments, the cylindrical portion 41 may be enclosed by circular disks 45 proximate each end portion 42, 44 to form an enclosed cylindrical portion or enclosure. In some embodiments, the enclosure may define a sealable opening 51 enabling a user to fill the enclosure with mass-increasing material, and to contain the mass-increasing material within the cylindrical portion, which may enable more force or pressure to be applied to the ground surface 12 by the roller apparatus 40. For example, such an enclosure may be configured to hold fluid material, solid material, or a combination of the two, and may include, but is not limited to, materials such as water, sand, calcium chloride, methanol, ethylene glycol, and propylene glycol, etc.

As described herein, the plurality of ground displacing elements 60 may engage and lift ground material, disperse the ground material, and form a plurality of reservoirs in the ground surface 12. Exemplary roller apparatuses 40 may include any number of ground displacing elements 60. As shown, the roller apparatus 40 includes four ground displacing elements 60. In one or more embodiments, the roller apparatus 40 may include 2 or more ground displacing elements 60, 3 or more ground displacing elements 60, 4 or more ground displacing elements 60, 6 or more ground displacing elements 60, 8 or more ground displacing elements 60, 10 or more ground displacing elements 60, 12 or more ground displacing elements 60, 14 or more ground displacing elements 60, 15 or more ground displacing elements 60, 16 or more ground displacing elements 60, 18 or more ground displacing elements 60, 20 or more ground displacing elements 60, 25 or more ground displacing elements 60, etc. In one or more embodiments, the roller apparatus 40 may include 40 or less ground displacing elements 60, 30 or less ground displacing elements 60, 26 or less ground displacing elements 60, 24 or less ground displacing elements 60, 19 or less ground displacing elements 60, 16 or less ground displacing elements 60, 12 or less ground displacing elements 60, 10 or less ground displacing elements 60, 8 or less ground displacing elements 60, 6 or less ground displacing elements 60, 5 or less ground displacing elements 60, etc.

The plurality of ground displacing elements 60 may be spaced in various manners and locations about the cylindrical portion 41. For example, as shown in FIG. 1C, the four ground displacing elements 60 are located and spaced equally, equidistantly, and/or equiangularly about the cylindrical portion 60 and the roller axis 16. The four ground displacing elements 60 of the exemplary implement 10 may be described as being spaced and located 90° apart from one another.

The ground displacing elements 60 may come in many forms, shapes, and/or sizes so as to be configured to engage ground material and lift the ground material to disperse the ground material and form a plurality reservoirs in the ground surface 12 when the outer surface 43 of the cylindrical portion 41 is engaged with the ground surface 12 when rolled over the ground surface 12. When the ground displacing elements 60 engage with ground material, each of the ground displacing elements 60 may be described as contacting the ground surface and extending into (e.g., beyond) the ground surface 12 so as to displace, or grab, a portion of ground material from below the ground surface 12. After the ground material has been acquired by the ground displacing element 60, the ground displacing element 60 may lift the ground material above the ground surface 12 and disperse the material such that a reservoir is created, or formed, in the ground surface 12. In one or more embodiments, the ground material that is lifted from the ground may be dispersed such that all, a majority of, or a portion of the ground material is not dispersed back into the reservoir that was created (e.g., may form mounds between the reservoirs in any direction, such as between reservoirs within the path of travel of the roller apparatus, or outside the path of travel of the roller apparatus).

Each ground displacing element 60 may include a blade portion 62 and one or more attachment portions 64 coupled to the blade portion 62. The one or more attachment portions 64 may be coupled to the cylindrical portion 41 of the roller apparatus 40 to hold, or position, the blade portion 62 with respect to the cylindrical portion 41. The blade portion 62 of a ground displacing element 60 may define a ground lifting surface 66 and a rear surface 68 opposite the ground lifting surface 66. An element thickness 69 may be defined between the rear surface 68 and the ground lifting surface 66. In at least one embodiment, the element thickness 69 may be about 3/16 inch to about ½ inch (i.e., about 0.1875 to about 0.5 inches).

The element width 70 of the ground displacing element 60 may be defined as the distance extending parallel to the roller axis 16 between a first edge 72 of the blade portion 62 and a second edge 74 of the blade portion 62 as shown in FIG. 1B. The element width 70 may be about 8 inches to about 42 inches, such as, e.g., about 8 inches, about 12 inches, about 21 inches, about 22 inches, about 24 inches, about 42 inches, or any width in between those described herein, but not limited thereto, etc.

The element thickness 69 may be defined in relative terms with respect to the element width 70. For example, the element thickness 69 may be substantially smaller than the element width 70 of the ground displacing element 60. In other words, the element width 70 of the ground displacing element 60 may be greater than the element thickness 69.

The element length 71 of the ground displacing element 60 may be defined as the distance extending perpendicular to the roller axis 16 from the location where the ground displacing element 60 is attached to the outer surface 43 (e.g., a tangential point) of the cylindrical portion 41 to a distal edge 73 of the blade portion 62 as shown in FIG. 1C. As shown, the element width 70 is greater than the element length 71. The element length 71 may be about 5 inches to about 16 inches, such as, e.g., about 6 inches, about 8 inches, about 10 inches, about 12 inches, about 14 inches, about 15 inches, about 16 inches, etc. In one or more embodiments, the element length 71 may be greater than or equal to about 1 inch, greater than or equal to about 2 inches, greater than or equal to about 3 inches, greater than or equal to about 4 inches, greater than or equal to about 5 inches, greater than or equal to about 6 inches, greater than or equal to about 7 inches, greater than or equal to about 8 inches, greater than or equal to about 9 inches, greater than or equal to about 10 inches, greater than or equal to about 11 inches, greater than or equal to about 12 inches, greater than or equal to about 13 inches, greater than or equal to about 14 inches, greater than or equal to about 15 inches, etc. In one or more embodiments, the element length 71 may be less than or equal to about 1.5 inches, less than or equal to about 2.5 inches, less than or equal to about 3.5 inches, less than or equal to about 4.5 inches, less than or equal to about 5.5 inches, less than or equal to about 6.5 inches, less than or equal to about 7.5 inches, less than or equal to about 8.5 inches, less than or equal to about 9.5 inches, less than or equal to about 10.5 inches, less than or equal to about 11.5 inches, less than or equal to about 12.5 inches, less than or equal to about 13.5 inches, less than or equal to about 14.5 inches, less than or equal to about 15.5 inches, less than or equal to about 16 inches, less than or equal to about 18 inches, less than or equal to about 20 inches, less than or equal to about 22 inches, less than or equal to about 24 inches, etc.

The size of the ground displacing elements 60 may be defined in relative terms with respect to the size of cylindrical portion 41. For example, as shown in the exemplary implement 10 depicted in FIGS. 1A-1C, the element width 70 may be approximately equal to the roller width 47. In other embodiments, the element width 70 may be greater than or less than the roller width 47. For example, the element width 70 may be greater than or equal to 50% of the roller width 47, greater than or equal 60% of the roller width 47, greater than or equal to 75% of the roller width 47, greater than or equal to 90% of the roller width 47, or greater than or equal to 100% of the roller width 47. Further, for example, the element width 70 may be less than or equal to 150% of the roller width 47, less than or equal 125% of the roller width 47, less than or equal to 100% of the roller width 47, less than or equal to 90% of the roller width 47, or less than or equal to 75% of the roller width 47.

Further, the size of the ground displacing element 60 may be defined in terms of a radius 49 of the cylindrical portion 41 that extends between the roller axis 16 and the outer surface 43 of the cylindrical portion 41. For example, in some embodiments, the element length 71 of the ground displacing element 60 may be greater than or equal to the radius 49 of the cylindrical portion 41. For example, the radius 49 of the cylindrical portion 41 may be in the range of about 6 inches to 9 inches, such as, e.g., about 6 inches, about 7 inches, about 8 inches, or about 9 inches, etc. As shown in FIG. 1C, the blade portion 62 of the ground displacing element 60 extends into and below the ground surface 12, as indicated by a blade penetration depth 76 (e.g., the depth the blade portion extends below the ground surface, such as the distance the blade extends or penetrates below a point, axis or plane of contact between the cylindrical portion 41 and the ground surface 12). The blade penetration depth may be less than the length of the blade portion 62. The blade penetration depth 76 may be, for example, in the range of about 1 inch to about 24 inches, or any depth in between those described herein. In one or more embodiments, the blade penetration depth 76 may be greater than or equal to about 1 inch, greater than or equal to about 2 inches, greater than or equal to about 3 inches, greater than or equal to about 4 inches, greater than or equal to about 5 inches, greater than or equal to about 6 inches, greater than or equal to about 7 inches, greater than or equal to about 8 inches, greater than or equal to about 9 inches, greater than or equal to about 10 inches, greater than or equal to about 11 inches, greater than or equal to about 12 inches, greater than or equal to about 13 inches, greater than or equal to about 14 inches, greater than or equal to about 15 inches, etc. In one or more embodiments, the element length 76 may be less than or equal to about 1.5 inches, less than or equal to about 2.5 inches, less than or equal to about 3.5 inches, less than or equal to about 4.5 inches, less than or equal to about 5.5 inches, less than or equal to about 6.5 inches, less than or equal to about 7.5 inches, less than or equal to about 8.5 inches, less than or equal to about 9.5 inches, less than or equal to about 10.5 inches, less than or equal to about 11.5 inches, less than or equal to about 12.5 inches, less than or equal to about 13.5 inches, less than or equal to about 14.5 inches, less than or equal to about 15.5 inches, less than or equal to about 16 inches, less than or equal to about 18 inches, less than or equal to about 20 inches, less than or equal to about 22 inches, less than or equal to about 24 inches, etc.

The ground lifting surface 66 may be configured to engage and lift ground material to disperse the ground material and form a plurality of reservoirs in the ground surface when the outer surface 43 of the cylindrical portion 41 is engaged with the ground surface 12 as the cylindrical portion 41 is rolled over the ground surface 12. The ground lifting surface 66 is the portion of the ground displacing element 60 that may be described as being configured to dig, remove, separate, break apart, and/or lift the ground material out of the ground, and subsequently disperse the ground material.

The blade portion 62, and/or the ground lifting surface 66 of the blade portion 62, may come in many shapes and sizes. For example, the blade portion 62 and/or the ground lifting surface 66 may be substantially planar as shown in the exemplary implement 10 depicted in FIGS. 1A-1C. In other words, the blade portion 62 and the ground lifting surface 66 lie, or extend, along a single plane. In other embodiments, the blade portion 62 and/or the ground lifting surface 66 may be non-planar such as, e.g. curved, cambered, convex, concave, angled, etc. Additionally, the blade portion 62 may include more than one portion that are positioned with respect to one another to provide a ground lifting surface 66 lying in more than one plane, each portion angled with respect to one another.

The blade portion 62, and in turn, the ground lifting surface 66, of each of the ground displacing elements 60 may be configured to extend tangentially with respect to the cylindrical portion 41. In other words, the blade portion 62 may be coupled to the cylindrical portion 41 in a tangential orientation, or a substantially tangential orientation. For example, each blade portion 62 may extend from the cylindrical portion 41 along a plane that is tangential to the outer surface 43 of the cylindrical portion 41. In other embodiments, such as those described herein with respect to FIGS. 4A-4B, the blade portions and/or ground lifting surfaces may also extend radially, or at any suitable angle, from the cylindrical portion.

The attachment portions 64 of the ground displacing elements 60 may provide coupling of the blade portions 62 to the cylindrical portion 41 of the roller apparatus 40. In at least one embodiment, the attachment portions 64 may be fixedly coupled (e.g., for example, welded) to the cylindrical portion 41 such that, e.g., the blade portions 62 of the ground displacing elements 60 may be removed and replaced (e.g., the blade portions 62 may be attached to the attachment portions 64 by fasteners 165, e.g., such as, screws, bolts, nuts, etc.). In at least one other embodiment, the attachment portions 64 may be removably coupled to the cylindrical portion 41 such that, e.g., the ground displacing elements 60 including both the blade portions 62 and the attachment portions 64 may be removable from the cylindrical portion 41 and/or replaced by another ground displacing element.

As shown in FIGS. 1A-1C, each ground displacing element 60 may include four attachment portions 64. In other embodiments, each of the ground displacing elements 60 may include less than 4 attachment portions 64 (e.g., such as 1 attachment portion, 2 attachment portions, and 3 attachment portions) or more than 4 attachment portions (e.g., such as 5 attachment portions, 6 attachment portions, 8 attachment portions, etc.). In at least one embodiment, the ground displacing elements 60 may not include an attachment portion 64 and the blade portion 62 may be directly coupled to the cylindrical portion 41. Each of the attachment portions 64 of the ground displacing elements 60 of the exemplary implement 10 depicted in FIGS. 1A-1C are coupled or attached to the side of the blade portion 62 that defines the ground lifting surface 66 (e.g., located on the counterclockwise side of the blade portion as viewed in FIG. 1C).

Figure 3:
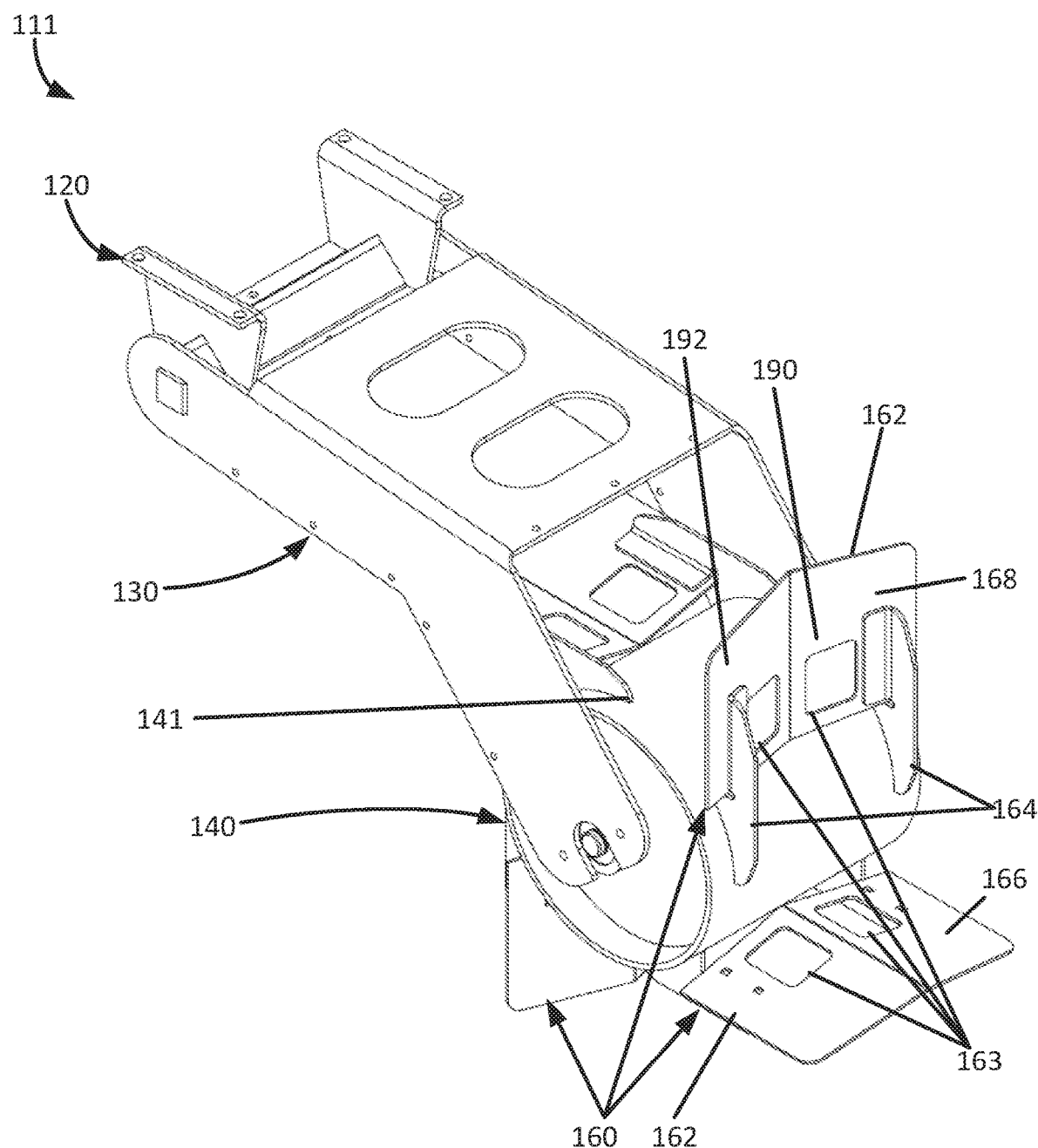
FIG. 3 is a perspective view of another exemplary implement.

In other embodiments, such as those shown in FIGS. 3-4, the one more attachment portions may be attached, or coupled, to the side of the blade portion defining the rear surface, which may be described as the non-working surface of the blade (e.g., located on the clockwise side of the blade portion as viewed in FIG. 4B).

Although the ground displacing elements 60, or members, are described herein as extending from the cylindrical portion 41 and/or the outer surface 43 of the cylindrical portion 41, the blade portions 62 of the ground displacing elements 60 may or may not extend completely to the outer surface 43 of the cylindrical portion 41. For example, a gap 75 may be present between the blade portion 62 and the outer surface 43 of the cylindrical portion 41. In other words, while the attachment portions 64 of the ground displacing elements 60 may be in contact with, or coupled to, the cylindrical portion 41, the blade portions 62 may not be in contact, or touch, the outer surface 43 of the cylindrical portion 41.

Figure 2A:
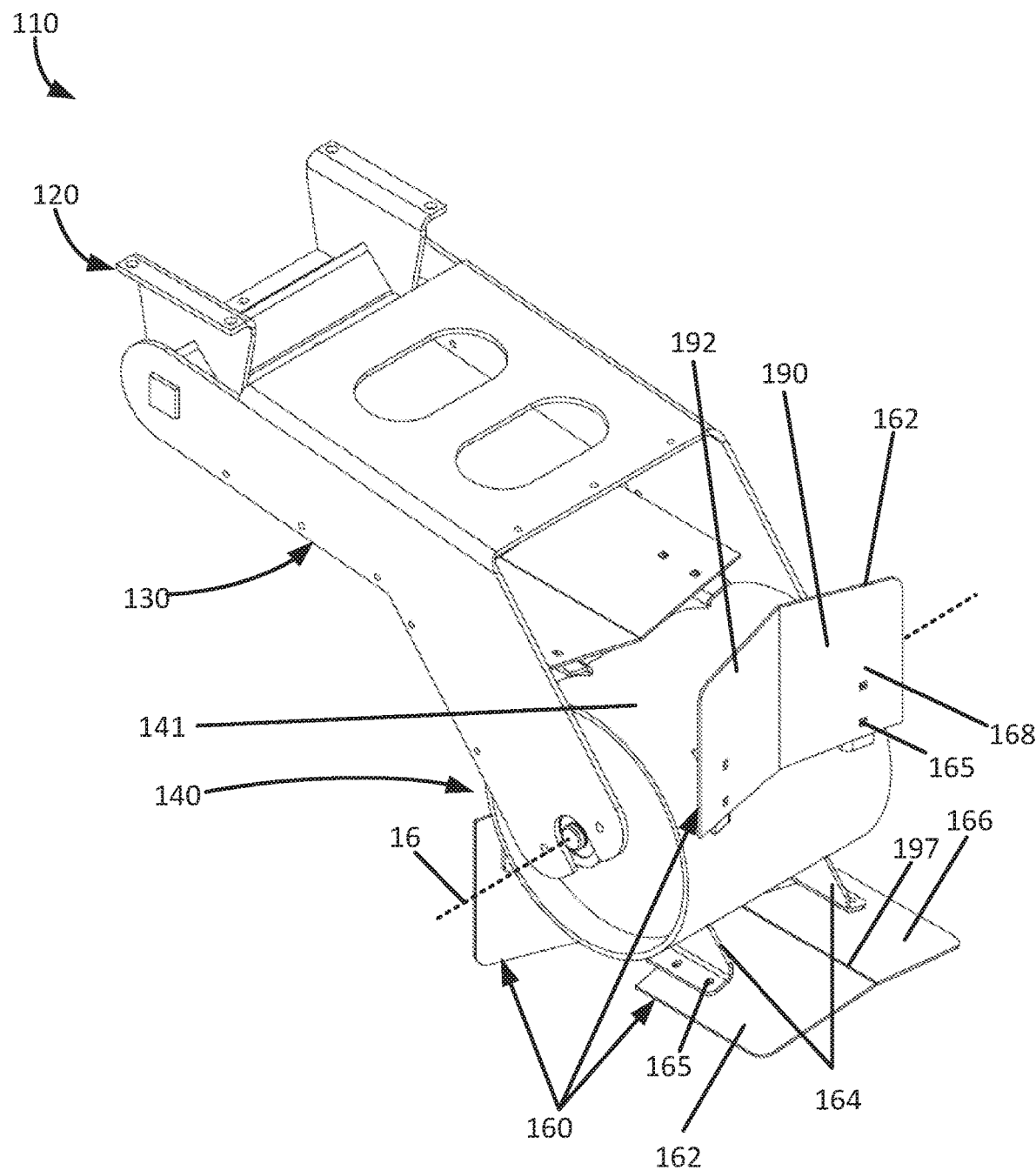
FIG. 2A is a perspective view of another exemplary implement.
Figure 2B:
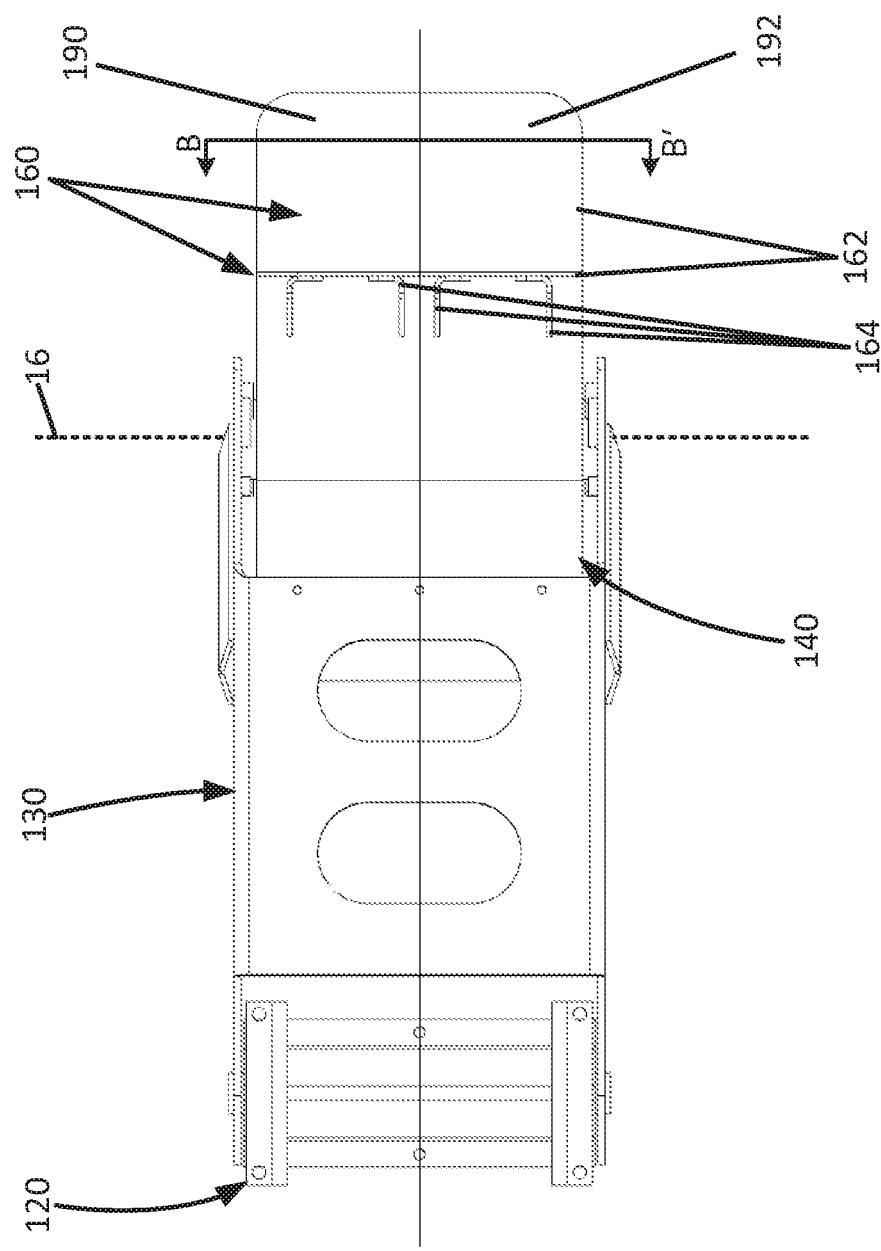
FIG. 2B is a top view of the implement of FIG. 2A.
Figure 2C:
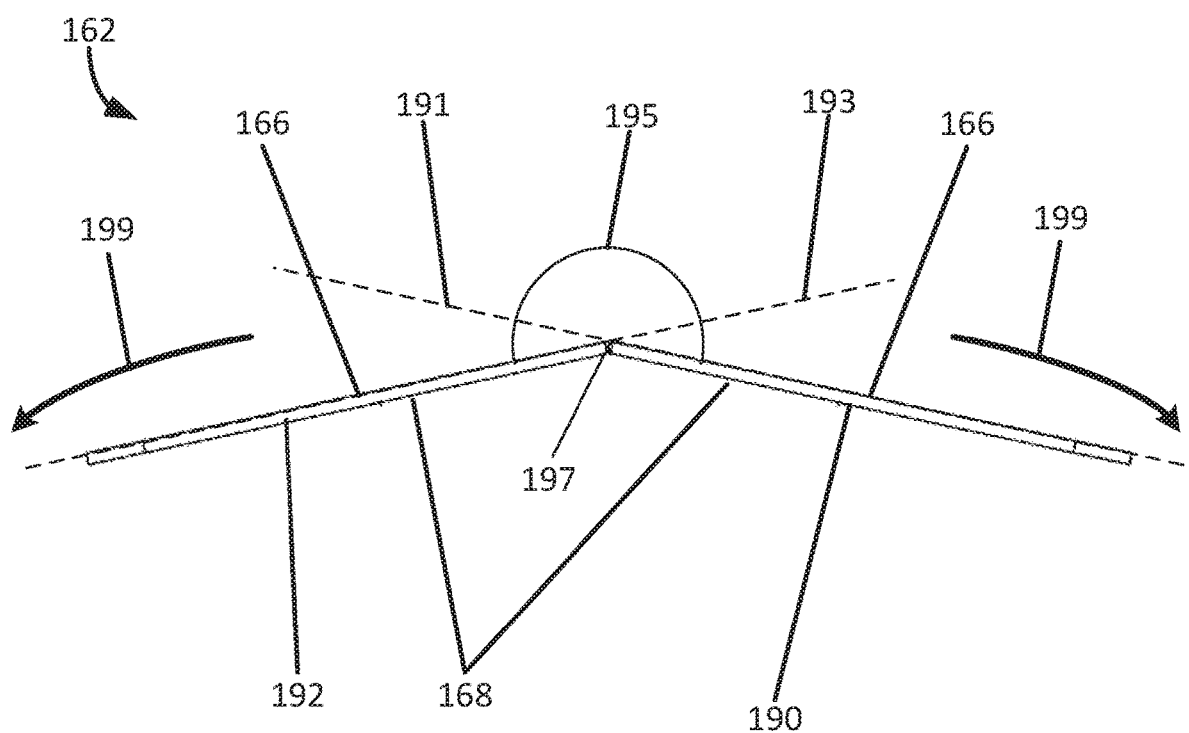
FIG. 2C is a cross sectional view of an exemplary ground displacing element of the implement of FIG. 2A taken along line B-B' as shown in FIG. 2B.

Another exemplary implement 110 is depicted in FIGS. 2A-2C. Several features and/or portions of the exemplary implement 110 may be similar to the exemplary implement 10 described herein with reference to FIGS. 1A-1D. For example, the mount portion 120, extension member 130, cylindrical portion 141 of the roller apparatus 140, and attachment portions 164 of the ground displacing elements 160 of the exemplary implement 110 may be similar to the mount portion 20, extension member 30, cylindrical portion 41 of the roller apparatus 40, and attachment portions 64 of the ground displacing elements 60 of the exemplary implement 10 of FIGS. 1A-1D. As such, such features and/or portions are not further described herein, and it is to be understood that one or more such features and/or portions may be used interchangeably between each and every embodiment described herein.

The exemplary implement 110 may include a plurality of ground displacing elements 160 that are configured differently than the ground displacing elements 60 of the exemplary implement 10 described herein with reference to FIGS. 1A-1D. More specifically, the blade portions 162 of the ground displacing elements 160 of the exemplary implement 110 are shaped differentially than the blade portions 62 of the ground displacing elements 60 of the exemplary implement 10.

Each of the ground displacing elements 160 may include a blade portion 162 and one or more attachment portions 164. As shown, each ground displacing element 160 includes two attachment portions 164 configured to attach the blade portion 162 to the cylindrical portion 141. As shown in FIGS. 2A-2C, the blade portion 162 and, in turn, the ground lifting surface 166, of the ground displacing elements 160 are bent, or angled, so as to define a first portion 190 and a second portion 192. The ground lifting surface 166 of each of the first portion 190 and the second portion 192 may lie, or extend within, different planes than each other as shown in the cross sectional view of the blade portion 162 in FIG. 2C.

The first portion 190 and the second portion 192 may be angled with respect to each other so as to be described as being non-planar, or not lying substantially in a single plane. For example, the first portion 190 may lie in a first plane 191 and the second portion 192 may lie in a second plane 193, and the first plane 191 may be different, or intersect with, the second plane 193 defining an angle 195. The angle 195 between the first portion 190 and the second portion 192 may be between about 185 degrees to about 265 degrees. For example, the angle 195 may be greater than or equal to about 185 degrees, greater than or equal to about 200 degrees, greater than or equal to about 210 degrees, greater than or equal to about 220 degrees, greater than or equal to about 230 degrees, or greater than or equal to about 240 degrees or more. Further, for example, the angle 195 may be less than or equal to about 265 degrees, less than or equal to about 255 degrees, less than or equal to about 245 degrees, less than or equal to about 225 degrees, or less than or equal to about 200 degrees, or any angle in between those listed above, but not limited thereto.

The first plane 191 and the second plane 193 may be described as intersecting at an apex 197. A tip portion of the apex 197 (FIGS. 2A and 2C) that is most distal from the cylindrical portion 141 may be the first portion of the blade 162 to contact the ground surface 12 when the implement 110 is being used to form reservoirs. In other words, the blade portion 162 may be pointed like a shovel (see, e.g., chisel tip 297 in FIG. 4A).

As shown in FIG. 2C, after the ground lifting surface 166 has lifted ground material from the ground, the ground lifting surface 166 may disperse ground material outside of the roller width, generally in either direction parallel to the roller axis 16 as shown by arrows 199. In other words, the non-planar or angled, ground lifting surface 166 of the implement 110 of FIGS. 2A-2C may be configured to disperse ground material in lateral directions, or directions orthogonal to the direction the vehicle is traveling. Dispersion of ground material, or soil, in these lateral directions may move ground material (e.g., create mounds of ground material) outside the width of the roller apparatus 140, and outside the roller apparatuses 140 path of travel.

Another exemplary implement 111 is depicted in FIG. 3, which may be similar to the implement 110 described herein with respect to FIGS. 2A-2C. The exemplary implement 111 may be different from the implement 110. For example, the exemplary implement 111 may define apertures, or openings, 163 in the blade portions 162 of the ground displacing elements 160. The apertures 163 in the blade portions 162 may allow some ground material to pass through the blade portions 162. For example, the apertures 163 (e.g., may be positioned adjacent the cylindrical portion 141) may be configured to prevent a buildup of ground material in a region of the blade portion 162 proximal to the cylindrical portion 141. Generally, the ground material may be dispersed as described with regard to the embodiment of FIGS. 2A-2C, however, in this embodiment, some ground material may also pass through the apertures 163 in the blade portions 162. Further, the apertures 163 may also provide additional tillage or breaking up of the ground material. Additionally, the apertures 163 may further reduce the weight of the blade portion 162.

Further, for example, the exemplary implement 111 of FIG. 3 may include attachment portions 164 that are attached, or coupled, to the rear surface 168 of the blade portion 162 (e.g., for example, located on the clockwise side of the blade portion as viewed in FIG. 3). Attachment portions 164 coupled to the cylindrical portion in this arrangement may reduce the amount of ground material that may be captured or clogged up in the attachment portions 164 or between the cylindrical portion 141 and the ground lifting surface 162.

Figure 4A:
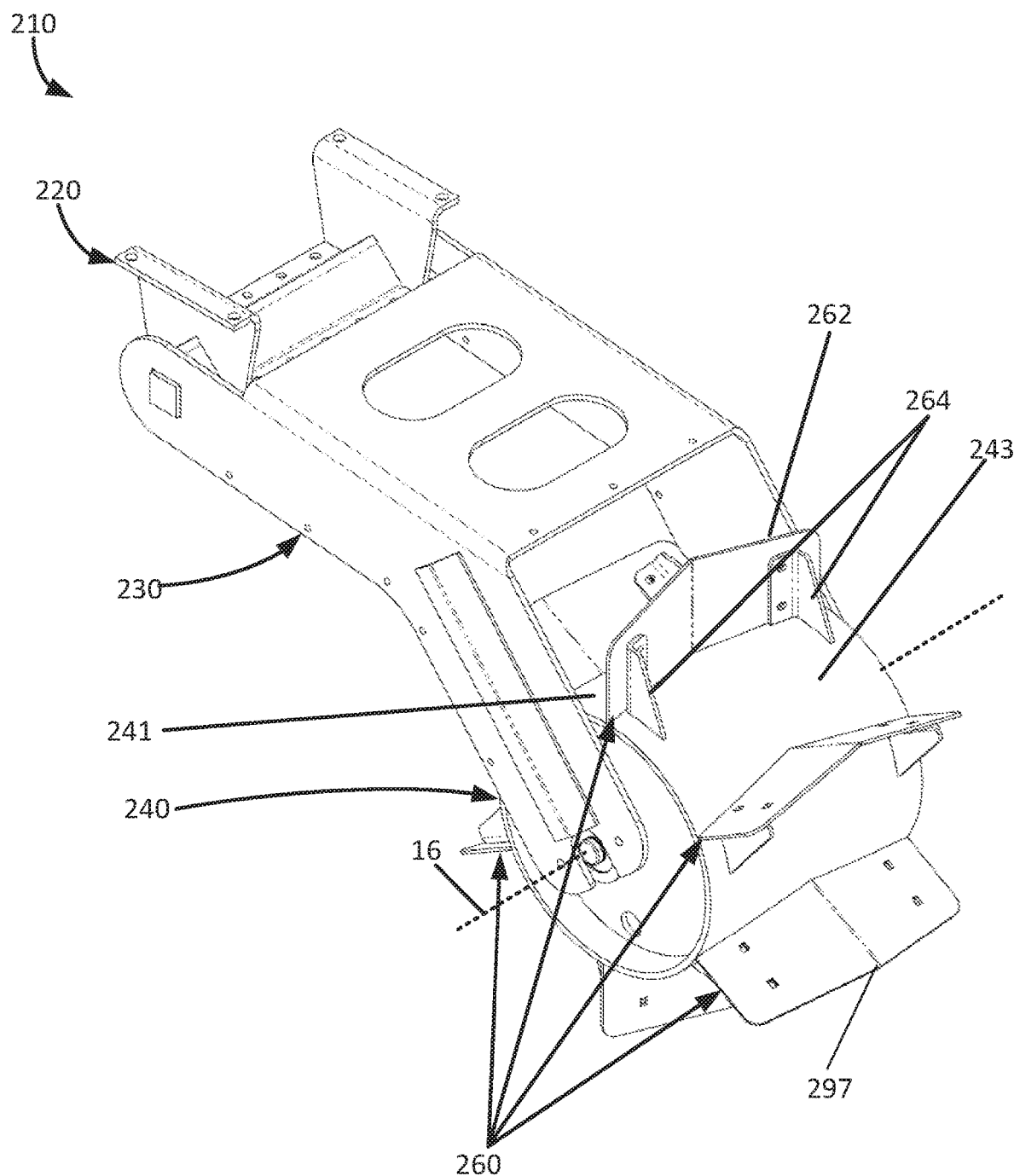
FIG. 4A is a perspective view of another exemplary implement.

Another exemplary implement 210 is depicted in FIGS. 4A-4B. Several features and/or portions of the exemplary implement 210 may be similar to the exemplary implement 10 described herein with reference to FIGS. 1A-1D and the exemplary implement 110 described herein with reference to FIGS. 2A-2C. For example, the mount portion 220, extension member 230, cylindrical portion 241 of the roller apparatus 240, and attachment portions 264 of the ground displacing elements 260 of the exemplary implement 210 may be similar to the mount portion 20, extension member 30, cylindrical portion 41 of the roller apparatus 40, and attachment portions 64 of the ground displacing elements 60 of the exemplary implement 10 of FIGS. 1A-1D. Further, for example, the shape and configuration of the blade portions 262 of the ground displacing elements 260 may be similar to the shape and configuration of the blade portions 162 of the ground displacing elements 160 of the exemplary implement 110 of FIGS. 2A-2C. As such, such features and/or portions are not further described herein, and it is to be understood that one or more such features and/or portions may be used interchangeably between each and every embodiment described herein.

The ground displacing elements 260 of the roller apparatus 240 of the exemplary implement 210 may be described as extending radially from the cylindrical portion 241 (e.g., from the outer surface 243) as opposed to tangentially as in the embodiments described herein with respect to FIGS. 1-3. In other words, the plane in which the ground displacing element 260 lies or partially lies, may not be tangential to the cylindrical portion 241, and instead, may extend through the roller axis 16. Additionally, the element length 270 as shown in FIG. 4B extending from the cylindrical surface 243 to the distal end of the ground displacing element 260 may be smaller than the element length 71 of the ground displacing members 60 described herein with reference to FIG. 1C. In this embodiment, the element length 270 may be about 6 inches to about 9 inches such, as, e.g., about 6 inches, about 7 inches, about 8 inches, or about 9 inches, etc. Additionally, the element length 270 may be described in terms relative to the radius 272 of the cylindrical portion 241. For example, the element length 270 in this embodiment may be less than or equal to the radius 272.

Exemplary implements may utilize various different types of suspension systems and apparatus to couple the mount portion to the extension member to transmit, transform and/or apply down pressure and/or maintain continuous contact between the roller apparatus and the ground surface. For example, the exemplary implement 310 depicted in FIGS. 5A-5C may include a suspension system 380 that utilizes a spring 382 (or other suitable suspension component) configured to provide suspension and bias about the pivot axis 14 between the mount portion 320 and the extension member 330.

Additionally, the roller apparatus 340 of the exemplary implement 310 includes a cylindrical portion 341 and a plurality of ground displacing elements 360 that are different than the ground displacing elements described herein with reference to FIGS. 1-4. The ground displacing elements 360 of the roller apparatus 340 may be configured to engage and compress ground material to disperse the ground material to provide a plurality of reservoirs when the roller apparatus 340 engages the ground surface. In some embodiments, the roller apparatus 340 may not be configured to pass in between rows of crops, but may, for example, have a long roller length that is greater than multiple crop rows.

Figure 6A:
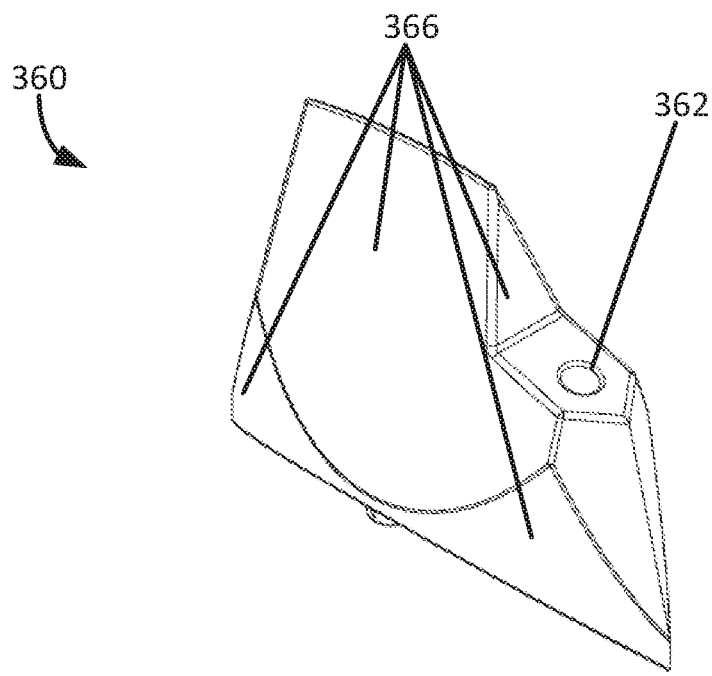
FIG. 6A is a top perspective view of an exemplary ground displacing element, e.g., for use with the implement of FIG. 5A.
Figure 6B:
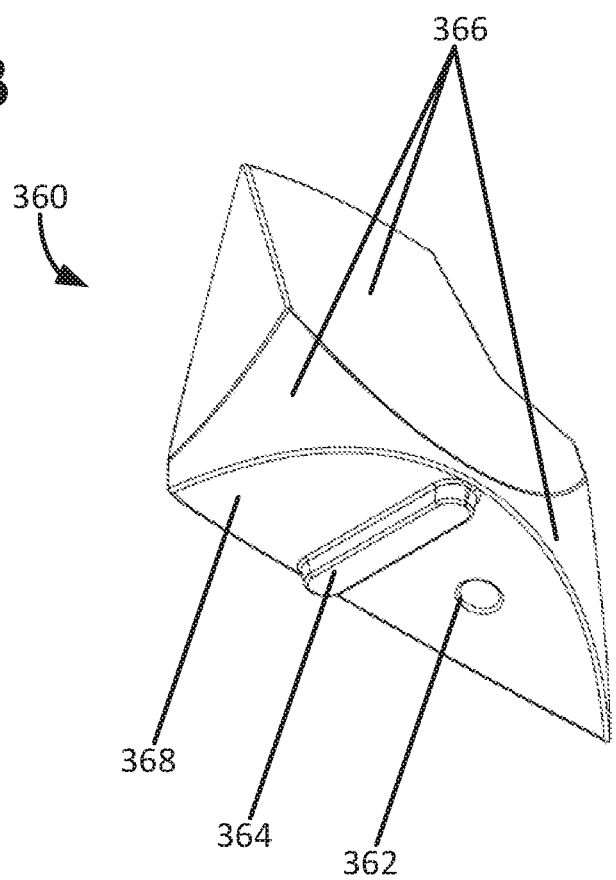
FIG. 6B is a bottom perspective view of the ground displacing element of FIG. 6A.

As shown in more detail in FIGS. 5C and 6A-6B, each of the of the plurality of ground displacing elements 360 may define an opening 362 extending therethrough configured to receive a fastener 363 such as, e.g., a bolt to couple the ground displacing element to the cylindrical portion 341. As such, the ground displacing elements 360 may be described as being removably couplable to and/or removably coupled to the cylindrical portion 341.

The ground displacing elements 360 may further define a plurality of ground displacing surfaces 366 and a bottom surface 368. The bottom surface 368 may be configured to be positioned adjacent the outer surface 343 of the cylindrical portion 341. As shown, the bottom surface 368 may be curved to match the curve of the cylindrical portion 341. Additionally, the ground displacing elements 360 may define a retention portion 364 protruding from the bottom surface 368 configured to mate with an opening of the cylindrical portion 341 as described herein with reference to FIGS. 7A-7B.

Figure 7A:
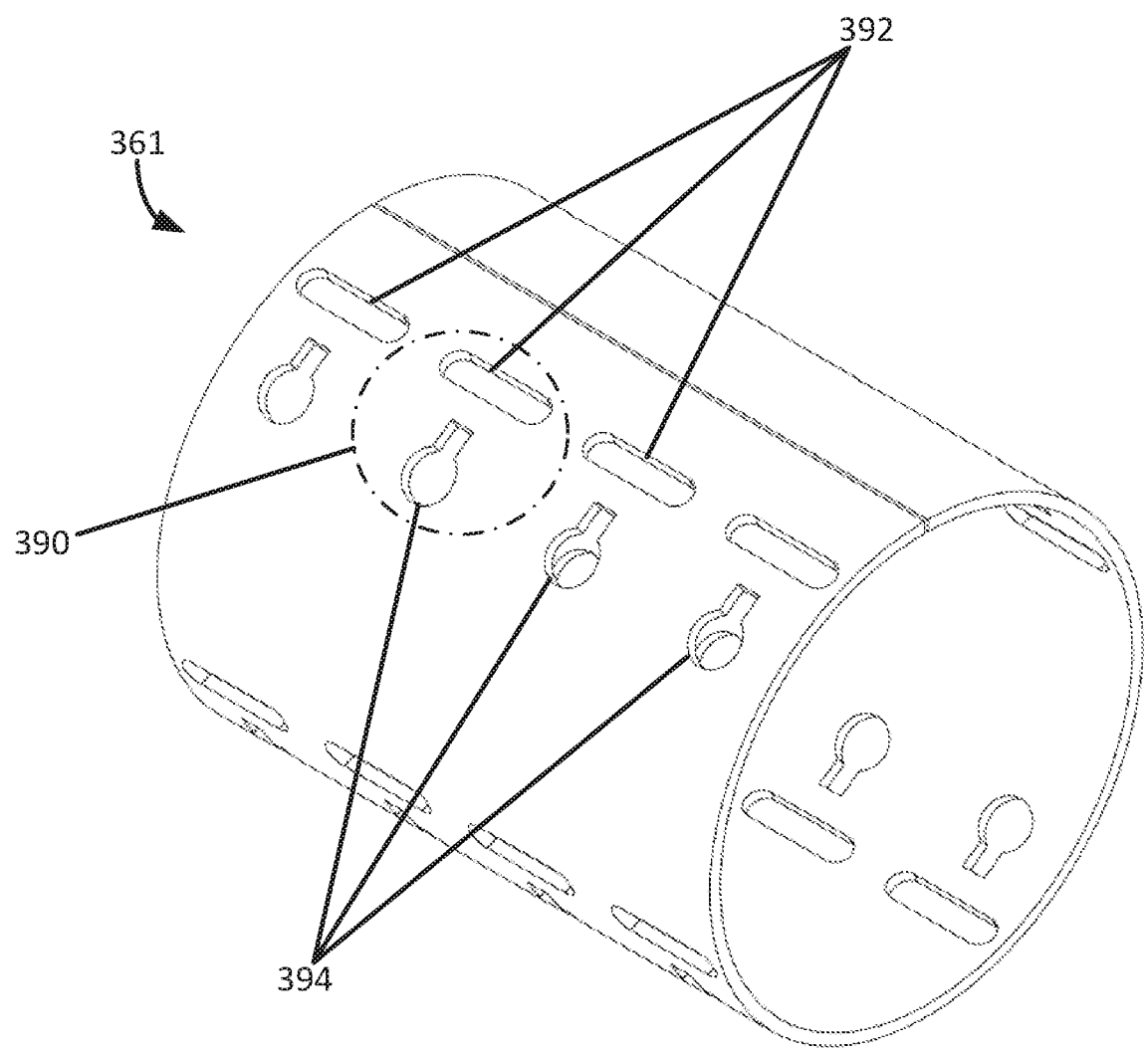
FIG. 7A is a perspective view of an exemplary cylindrical portion, e.g., for use with the implement of FIG. 5A.
Figure 7B:
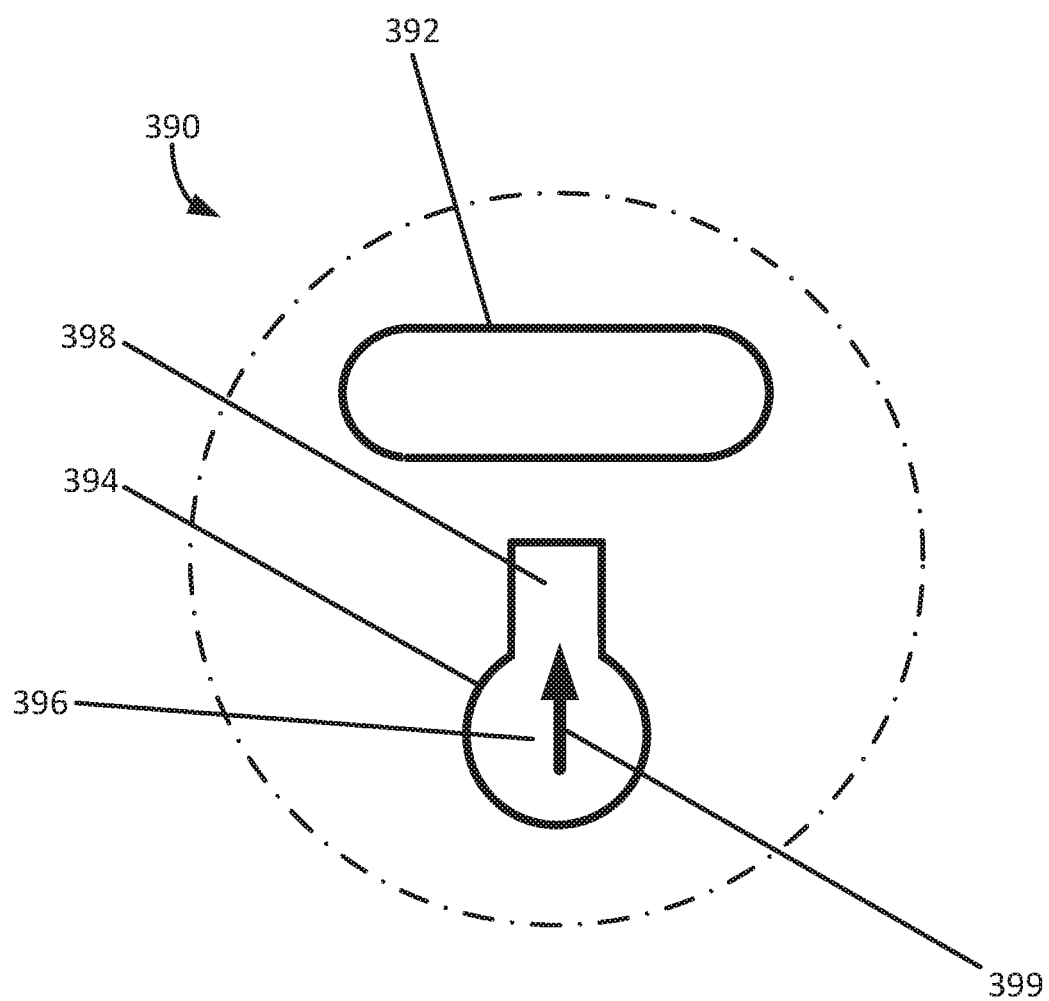
FIG. 7B is an enlarged view of an exemplary attachment region of the cylindrical portion of FIG. 7A.

As shown in FIGS. 7A-7B, the exemplary cylindrical portion 341 may define a plurality of secondary openings 392 (e.g., any shaped openings, or combination of openings, including holes, slots, or any other suitable openings) and a plurality of keyhole-shaped openings 394 (e.g., shaped openings providing the functionality described herein including a larger opening region adjacent a smaller opening region; such opening regions having an suitable shape). One secondary opening 392 and one keyhole-shaped opening 394 paired together may be configured to receive the retention portion 364 and a fastener 363 of a ground displacing element 360, respectively, to removably couple the ground displacing element 360 to the cylindrical portion 341. For example, each of the plurality of ground displacing elements 360 may be removably coupled to the cylindrical portion 341 using a secondary opening 392 and a keyhole-shaped opening 394.

More specifically, as shown in the enlarged region 390 of FIG. 7B, each fastener 363 may be configured to extend through the opening 362 of the ground displacing element 360. During attachment, the fastener 363 may be first located in a circular region 396 of the keyhole-shaped opening 394 such that the head of the bolt may be placed through the circular region 396 and then the ground displacing element may be slid in the direction of arrow 399 such that the fastener 363 may be located in a slot region 398 of the keyhole-shaped opening 394. When fastener 363 is located in the slot region 398, the retention portion 364 may line up with and be received by the secondary opening 392 to, e.g., assist in retaining the ground displacing element 360 coupled to the cylindrical portion 341. As shown, the diameter of the circular region 396 may be larger than a width of the slot region 398, e.g., to accept a head of a bolt.

Figure 7C:
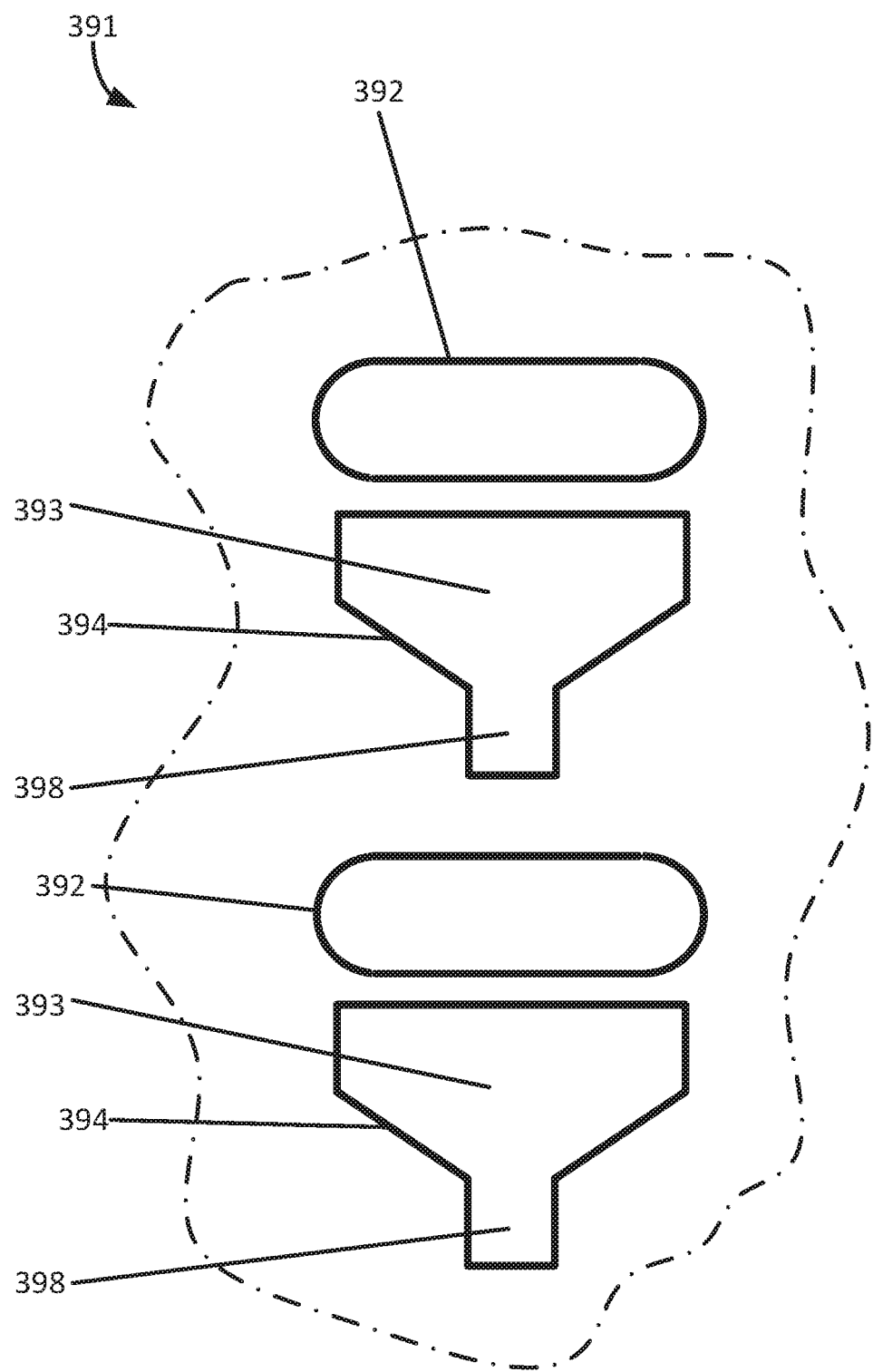
FIG. 7C is an enlarged view of an exemplary attachment region similar to the attachment region of FIG. 7B.
Figure 8:
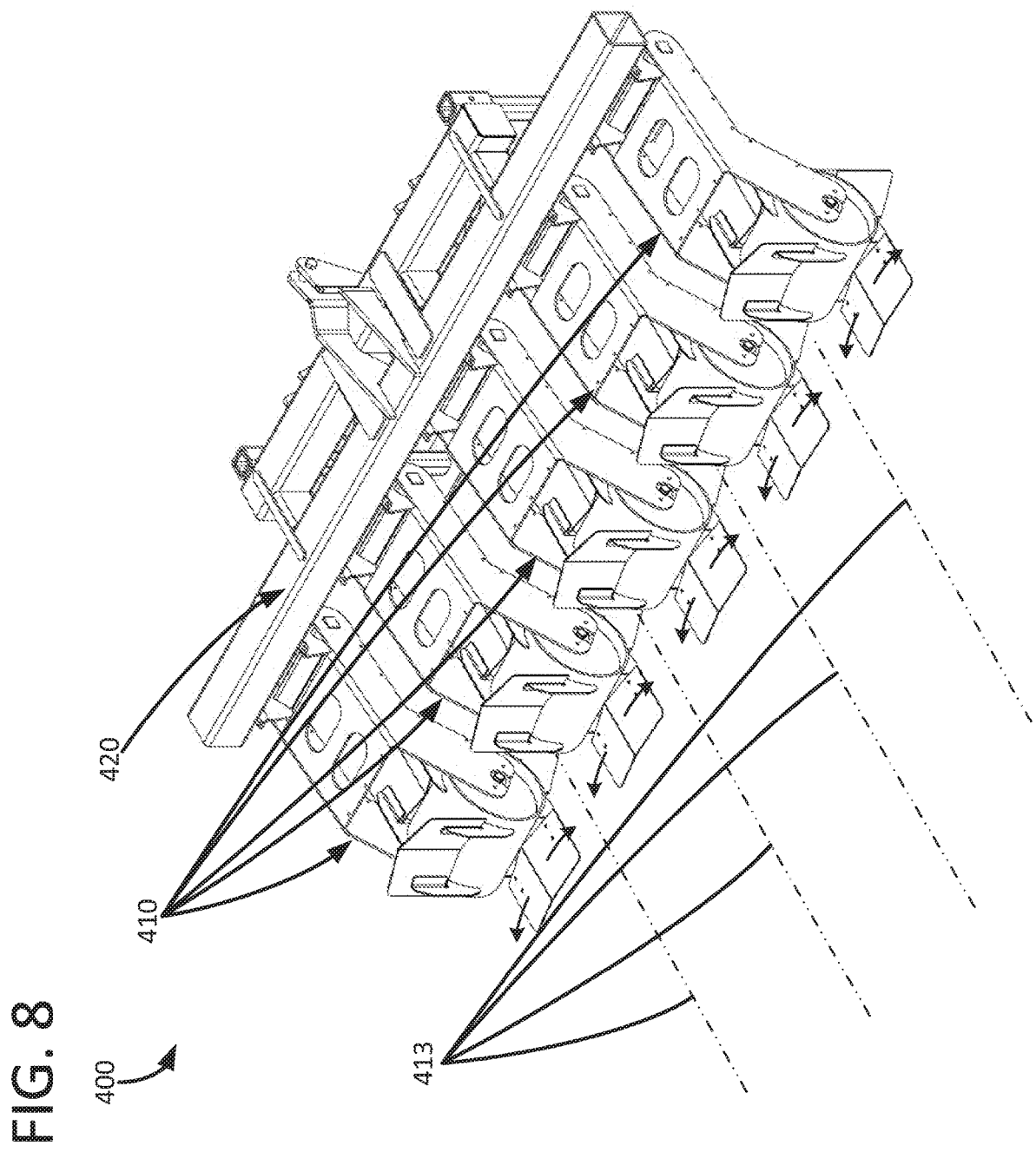
FIG. 8 is a perspective view of an exemplary implement system including a plurality of implements, e.g., such as the implement depicted in FIG. 3A.

Another exemplary attachment, or coupling, arrangement 391 is depicted in FIG. 7C. In this example, each ground displacing element may be removable attached, or coupled, to the cylindrical portion, which may be similar to the exemplary cylindrical portion 341. The cylindrical portion of the exemplary arrangement 391, however, includes, or defines, two keyhole-shaped openings 394 and two secondary openings 392 for attachment, or coupling, of each of the ground displacing elements. Each of the two keyhole-shaped openings 394 may further define a larger region 393 and a slot region 398. The larger region 393 of the key-hole shaped openings 394 may be configured to direct, or funnel, a fastener 363 to the slot region 398 when the ground displacing element is being attached, or coupled, to the cylindrical portion. The use of two keyhole-shaped openings 394 and two secondary openings 392 may allow, or provide, a more secured attachment or coupling of the ground displacing elements to the cylindrical portion. It is to be understood that any number of keyhole-shaped openings 394 and secondary openings 392 may be used with the exemplary embodiments described herein. Further, in some embodiments, the number, or amount, of key-hole shaped openings 394 may not be the same as the number, or amount, of secondary openings 392.

An exemplary implement system 400 may include a frame apparatus 420 and a plurality of implements 410 coupled to the frame apparatus 420. The frame apparatus 420 may include one or more various structures such as, e.g., a beam, etc., that are configured to couple the system 400 to a vehicle. As shown, the plurality of implements 410 may be arranged and mounted to the frame apparatus 420 in a spaced apart arrangement along the frame apparatus 420 to facilitate the implements 410 passing in between rows of crops represented by lines 413, e.g., so as not to damage the crops and create reservoirs in the ground between the rows of crops when the system 400 traverses across a ground surface.

In any of the embodiments discussed herein, one or more ground breaking apparatus (e.g., sweep blades, row crop sweeps, chisel elements, or sweep cultivators) may be coupled to any of the implements or systems described herein. The one or more ground breaking apparatus may be configured to break up or loosen the ground material prior to the roller apparatus forming reservoirs in the ground surface (e.g., mounted ahead of the roller apparatus in the direction of travel).

Another exemplary implement, or implement apparatus, 910 is depicted in FIGS. 9A-9E. Several features and/or portions of the exemplary implement, or implement apparatus, 910 may be similar to the exemplary implement 10 described herein with reference to FIGS. 1A-1D. For example, the mount portion 520, extension member 530, cylindrical portion 541 of the roller apparatus 540, and torsion assembly 580 of the exemplary implement 510 may be similar to the mount portion 20, extension member 30, cylindrical portion 41 of the roller apparatus 40, and torsion assembly 80 of the exemplary implement 10 of FIGS. 1A-1D. As such, such features and/or portions are not further described herein, and it is to be understood that one or more such features and/or portions may be used interchangeably between each and every embodiment described herein.

The exemplary implement 510 may include a plurality of ground displacing elements 560 that are configured differently than the ground displacing elements 60 of the exemplary implement 10 described herein with reference to FIGS. 1A-1D. For example, the exemplary implement 510 may include 15 ground displacing elements 560 arranged in a plurality of rows as described further herein. Further, for example, the size and shape of the ground displacing elements 560 as well as the attachment, or coupling, of the ground displacing elements 560 may be different than the ground displacing elements 60 of the exemplary implement 10. Nonetheless, the functionality of the ground displacing elements 560 may be substantially similar to the functionality of the ground displacing elements 60 described herein with reference to FIGS. 1A-1D as well as the remainder of the ground displacing elements 160, 260, 360 described herein with reference to FIGS. 2-6. For example, the ground displacing elements 560, when used with the exemplary implement 510, may be configured to extend into the ground, or beyond the ground surface 12, to engage and disperse the ground material when the roller apparatus 540 is engaged with the ground surface 12 as the implement 510 traverses the ground surface 12. Further, it may be described that the ground displacing elements 560 may be configured to engage and lift ground material and form a plurality of reservoirs in the ground surface. Still further, the ground displacing elements 560 may be described as being configured to dig, remove, separate, break apart, rip, and/or lift the ground material out of the ground, and subsequently, disperse the ground material.

Figure 9A:
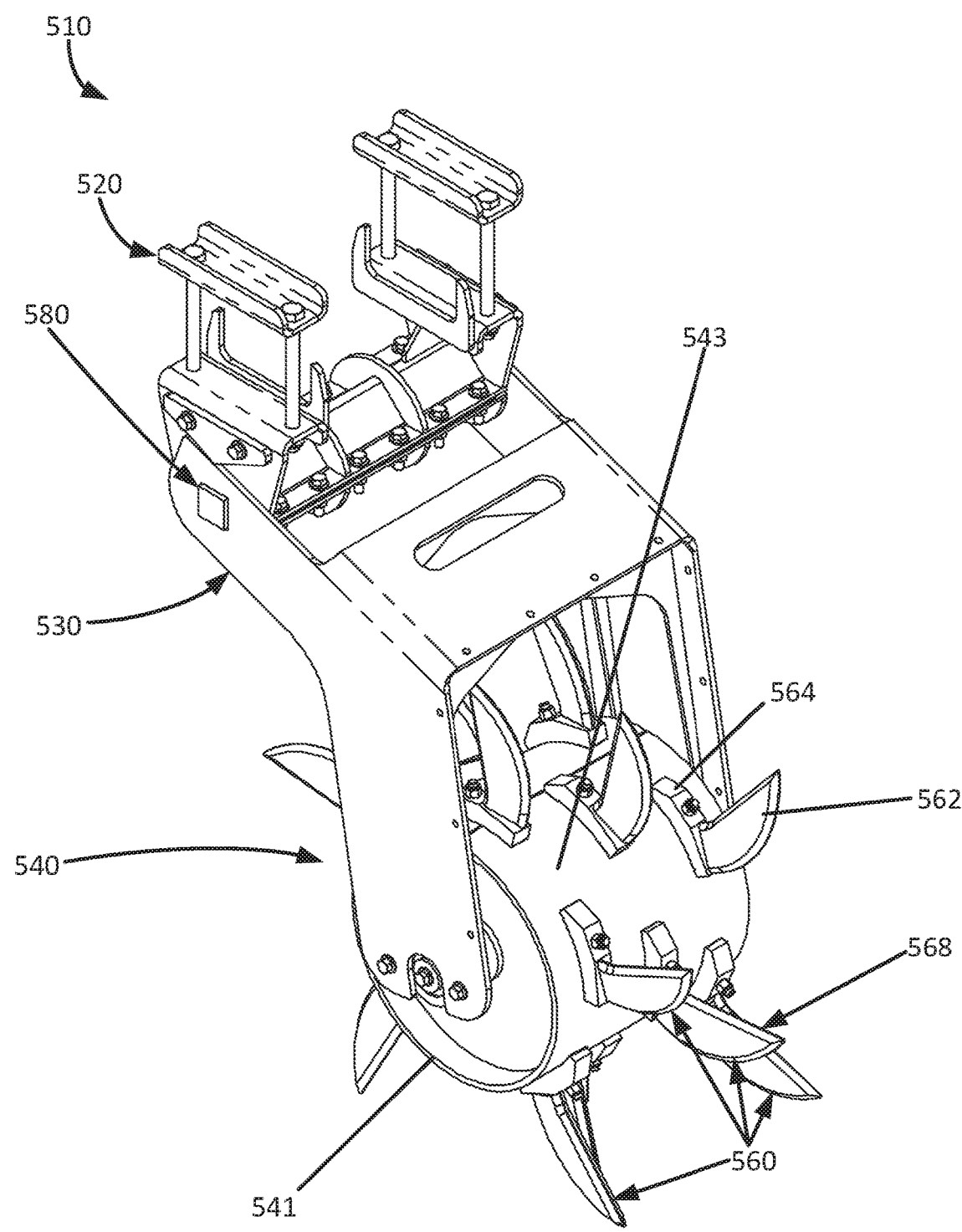
FIG. 9A is a perspective view of another exemplary implement.
Figure 9B:
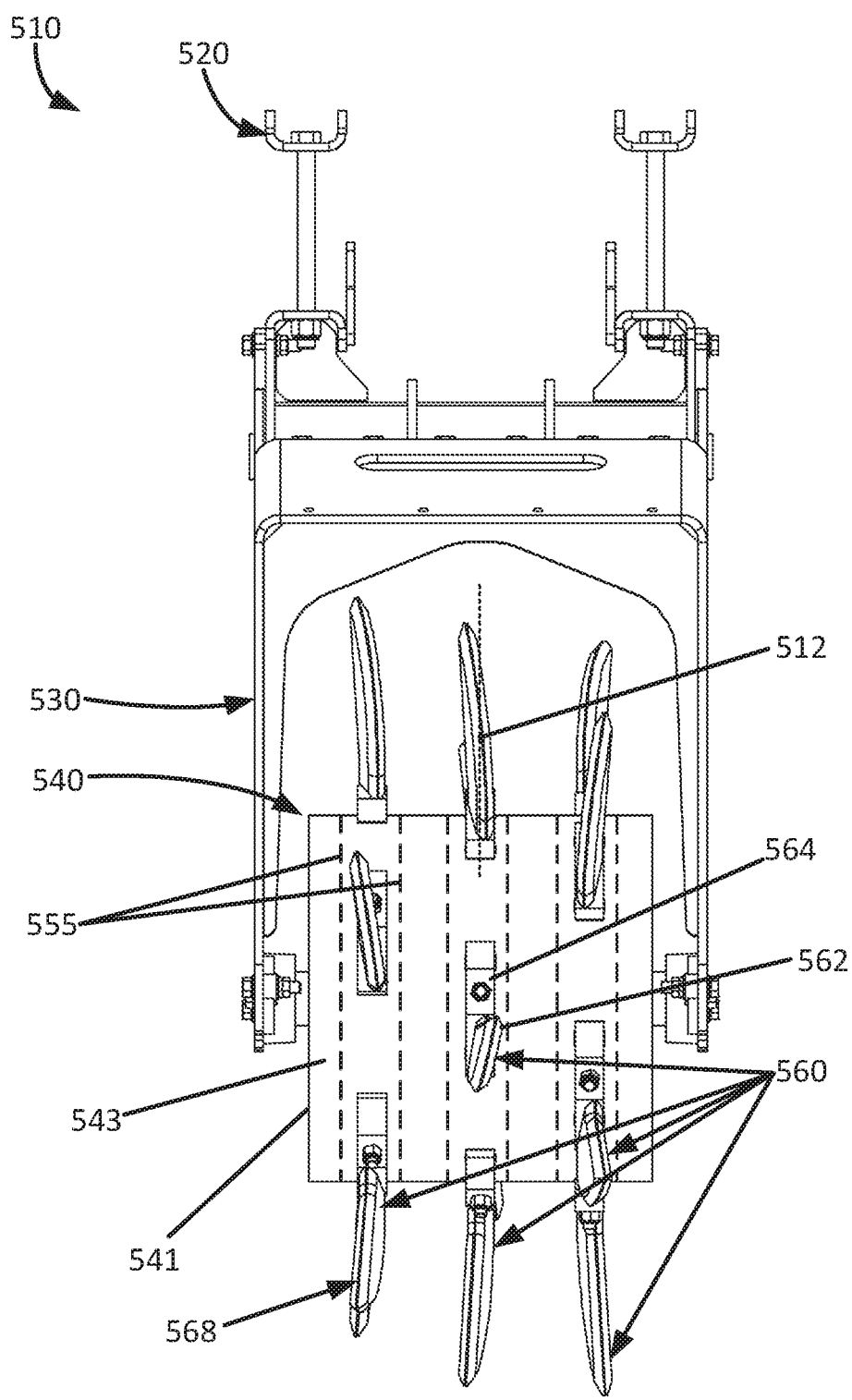
FIG. 9B is a top view of the implement of FIG. 9A.
Figure 9C:
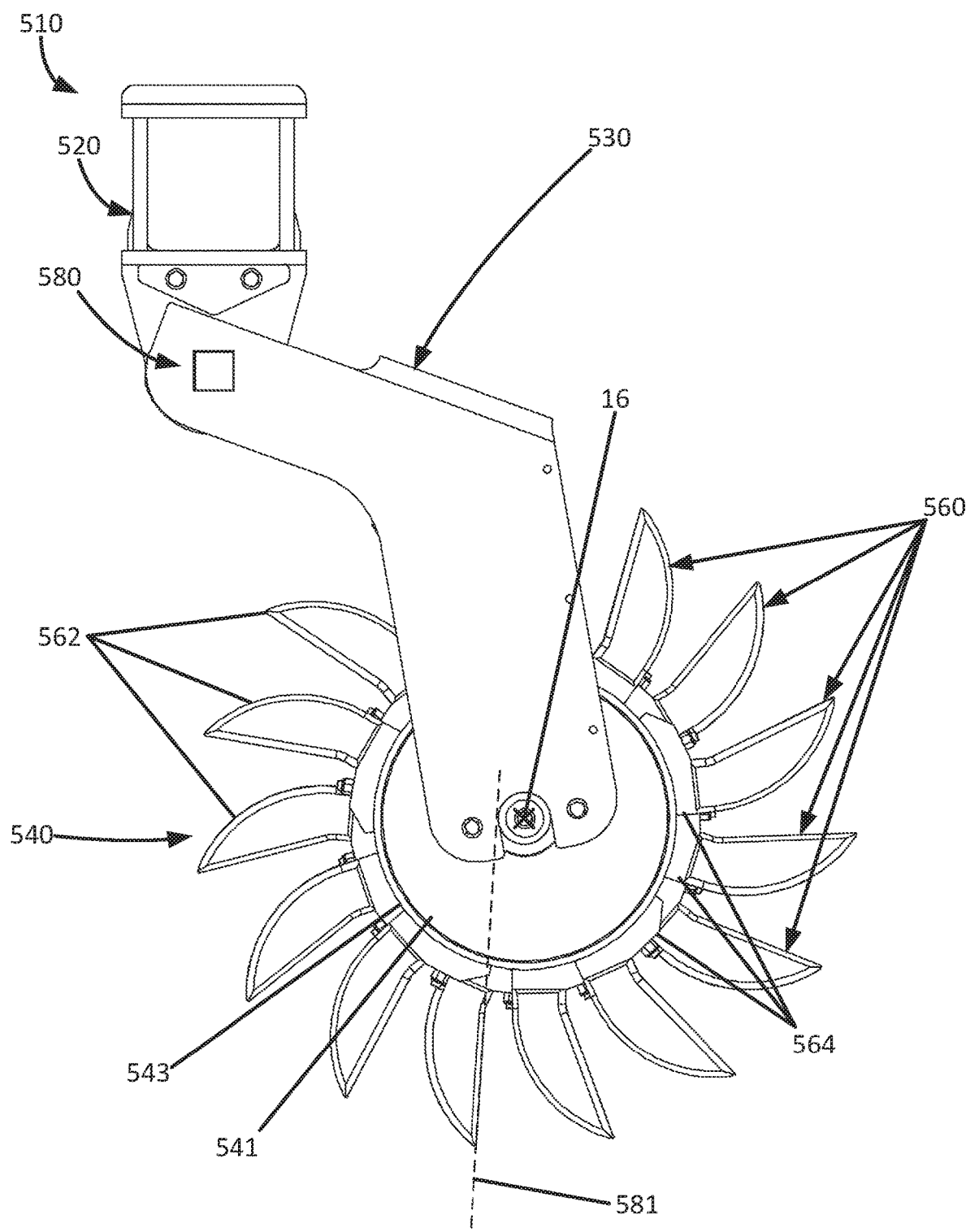
FIG. 9C is a top view of the implement of FIG. 9A.

As shown in FIG. 9A, the roller apparatus 540 may include cylindrical portion 541, which defines an outer cylindrical surface 543. The plurality of ground displacing elements 560 may be removably coupled to the cylindrical portion 541 (e.g., adjacent to the outer cylindrical surface 543, in contact with the outer cylindrical surface 543, etc.). As shown in FIG. 9B, the plurality of ground displacing elements 560 may be arranged in a plurality of rows (each row being noted as being between a pair of the dotted lines 555) that circumferentially extend around the outer cylindrical surface 543. In this embodiment, the plurality of ground displacing elements 560 may be arranged, or grouped, in three rows. In other embodiments, the plurality of ground displacing elements 560 may be arranged, or grouped, in more than three rows such as, e.g., four rows, six rows, etc. or less than three rows such as, e.g., two rows and one row. Additionally, in this embodiment, the plurality of ground displacing elements 560 may be described as being in a staggered configuration or arrangement. For example, the plurality of ground displacing elements 560 of the left-most row in FIG. 9B may be not be coupled to the cylindrical portion 541 at the same point about the circumference of the cylindrical portion 541 as the plurality of ground displacing elements 560 of the other rows such as the middle row or right-most row. In other words, it may be described that the plurality of ground displacing elements 560 are staggered with respect to each other such that each of the plurality of ground displacing elements 560 do not extend from the same location, or point, about the circumference of the cylindrical portion as any other of ground displacing elements 560 (e.g., located in other rows). Further, although is this embodiment, all of the plurality of ground displacing elements 560 are staggered with respect to each other, it is to be understood that, in some embodiments, two or more rows of ground displacing elements 560 may be aligned with each other (e.g. located at the same point, or location, about the circumference of the cylindrical portion 541).

Each of the ground displacing elements 560 may include a blade portion 562 and an attachment portion 564 coupled (e.g., fixedly coupled, integral to, etc.) to the blade portion 562. The attachment portion 564 may be removably coupled to the cylindrical portion 541. More specifically, the attachment portion 564 may be removably coupled to the cylindrical portion 541 such that the attachment portion 564 is adjacent, or in contact with, at least a region or section of the outer cylindrical surface 543 of the cylindrical portion 541.

Figure 9D:
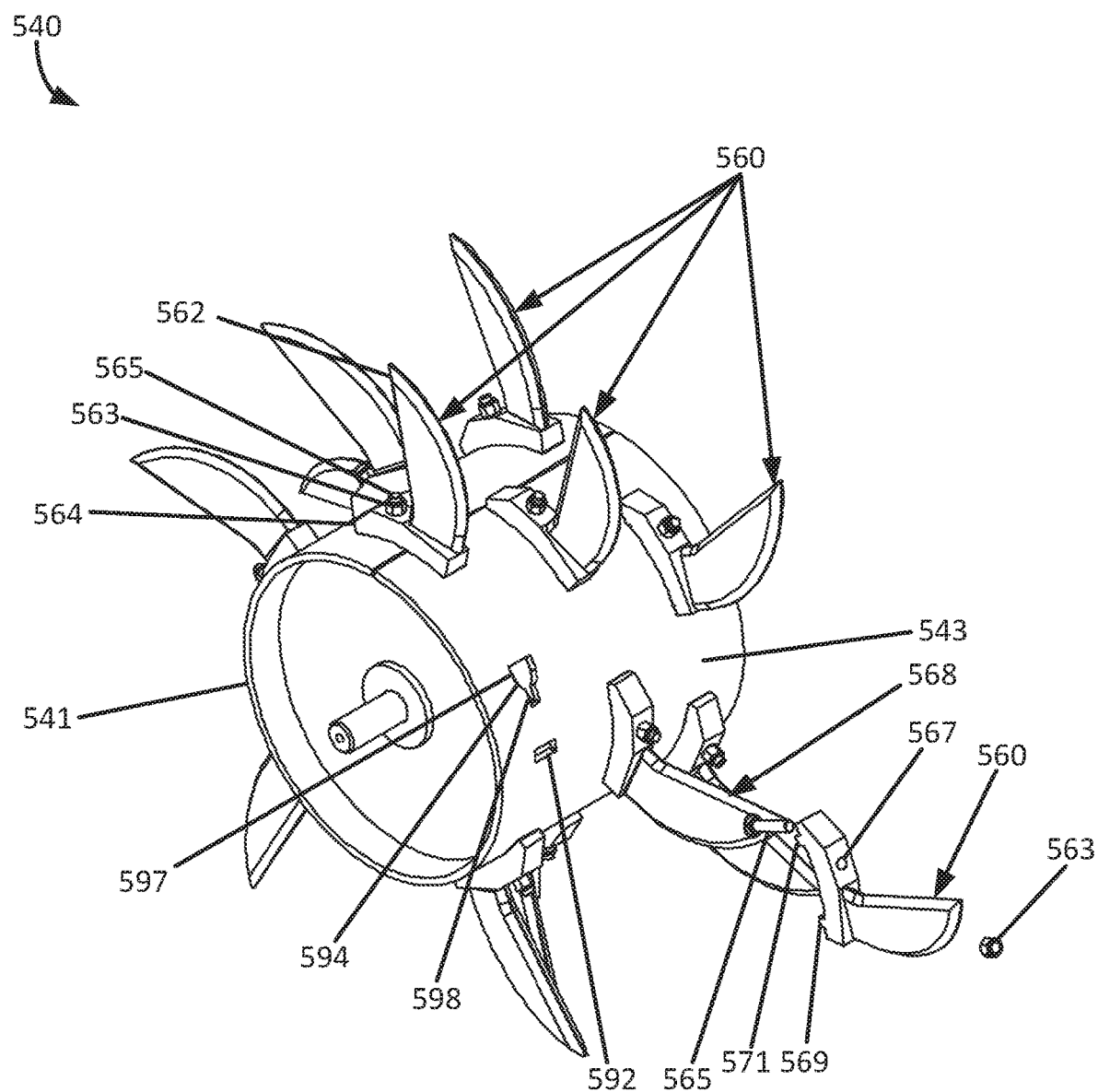
FIG. 9D is a perspective view of the roller apparatus of the implement of FIG. 9A.

To provide the removable coupling between the attachment portion 564 and the cylindrical portion 541, the attachment portion 564 may define an opening 567 configured to receive a fastener 565 as shown in FIG. 9D which shows one ground displacing element 560 un-coupled from the cylindrical portion 541. The fastener 565 may be configured to be used, or in conjunction, with a keyhole-shaped opening 594 that extends through the outer cylindrical surface 543 of the cylindrical portion 541 similar to as described herein with respect to FIGS. 7A-7C. Further, the cylindrical portion 541 may further define a secondary opening 592 for each of the ground displacing elements 560. Thus, the cylindrical portion 541 may define a plurality of secondary openings 592 (e.g., any shaped openings, or combination of openings, including holes, slots, or any other suitable openings) and a plurality of keyhole-shaped openings 594 (e.g., shaped openings providing the functionality described herein including a larger opening region adjacent a smaller opening region; such opening regions having an suitable shape). One secondary opening 592 and one keyhole-shaped opening 594 paired together may provide the coupling of a ground displacing element 560 to the cylindrical portion 541.

More specifically, each fastener 565 may be configured to extend through the opening 567 of the attachment portion 564 of the ground displacing element 560. During attachment, the fastener 565 may be first located in a larger region 597 of the keyhole-shaped opening 594 such that a portion of the fastener 565 (e.g., the head of a bolt) may be placed through the larger region 597 and then the ground displacing element 560 may be moved such that the fastener 565 may be located in a slot region 598 of the keyhole-shaped opening 594. When the fastener 565 is located in the slot region 598, a retention portion 569 of the attachment portion 564 of the ground displacing element 560 may align, or "line up," with and be received by the secondary opening 592 to, e.g., assist in retaining the ground displacing element 560 coupled to the cylindrical portion 541. Additionally, the attachment portion 564 may further include an additional retention portion 571 configured to be located in the keyhole-shaped opening 594 (e.g., the larger region 597 of the keyhole-shaped opening 594). In other words, the attachment portion 564 of the ground displacing element 560 may include a first retention portion 569 configured to be located in the secondary opening 592 and a second retention portion 571 configured to be located in the larger region 597 of the keyhole-shaped opening 594 to restrict, or retain, the ground displacing element 560 to the cylindrical portion 541. Once the first and second retention portions 569, 571 are located in the secondary opening 592 and the larger region 597 of the keyhole-shaped openings 594 and the fastener 565 extends through the opening 567 and a portion of the fastener 565 is located in the slot region 598 of the keyhole-shaped opening 594, a nut 563, or other restriction device, may be coupled to the fastener 565 to couple the attachment portion 564 to the outer cylindrical surface 543 of the cylindrical portion 541.

In other words, the fastener 565 may be located in the opening 567 of the attachment portion 564 of the ground displacing element 560 and the ground displacing element 560 may be located, or positioned, such that a portion of the fastener 565 such as a "head" of a bolt extends through the larger region 597 of the keyhole-shaped opening 594 (e.g., extends through the outer cylindrical surface 543 of the cylindrical portion 541). Then, the ground displacing element 560 may be moved to slide the fastener 565 towards the slot region 598 of the keyhole-shaped opening 594 such that the portion of the fastener 565 is restricted from passing back through the keyhole-shaped opening 594 (e.g., due to the size of the slot region 598 being smaller than the larger region 597). Or, the fastener 565 may be located in the larger region 597 and slid into the slot region 594 prior to the ground displacing element 560 being positioned such that the fastener is located in the opening 567 and proximate the cylindrical portion 541. Additionally, the ground displacing element 560 may be moved to align the first and second retention portions 569, 571 with the secondary opening 592 and the larger region 597 of the keyhole-shape opening 594 such that the first and second retention portions 569, 571 may be received by the secondary opening 592 and the larger region 597 of the keyhole-shape opening 594, respectively. Then, a restriction device 563 such as a nut may be secured, or coupled, to the fastener 565 to complete the coupling of the attachment portion 564, and thus, the ground displacing element 560, to the cylindrical portion 541.

Figure 9E:
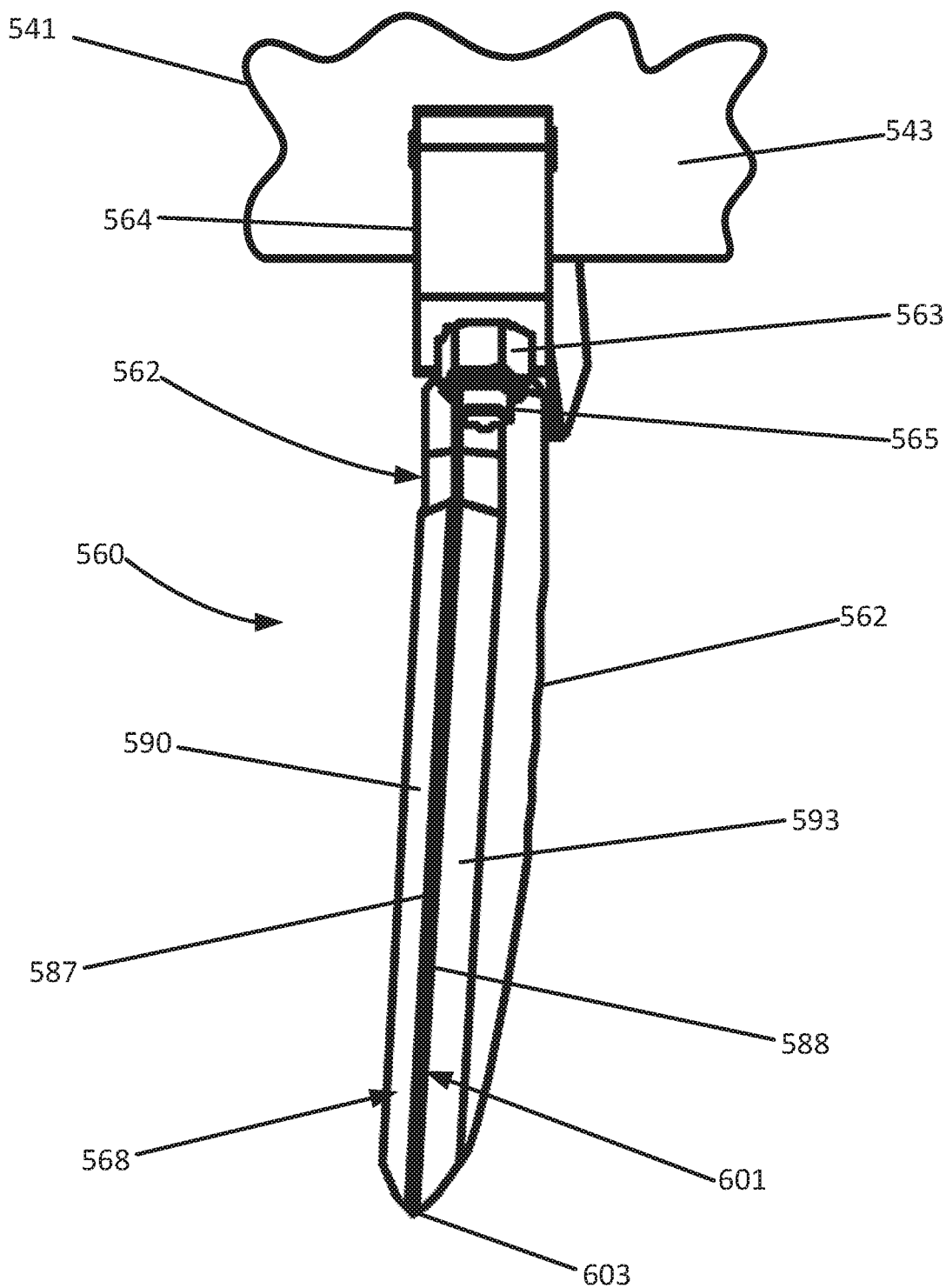
FIG. 9E is an enlarged top view of the roller apparatus of the implement of FIG. 9A.

Similar to the blade portion 162 of the ground displacing elements 160 described herein with reference to FIGS. 2A-2C, the blade portion 562 of the ground displacing elements 560 defines, or includes, a ground lifting surface 568 that may be described as being bent, or angled, so as to define a first portion 590 and a second portion 593 as shown in FIG. 9E. The first portion 590 and the second portion 593 may lie, or extend within, different planes than each other so as to be described as being non-planar, or not lying substantially in a single plane. For example, the first portion 590 may lie in a first plane and the second portion 593 may lie in a second plane, and the first plane may be different, or intersect with, the second plane defining an angle. The angle between the first portion 590 and the second portion 593 may be between about 185 degrees to about 300 degrees. For example, the angle may be greater than or equal to about 185 degrees, greater than or equal to about 200 degrees, greater than or equal to about 210 degrees, greater than or equal to about 220 degrees, greater than or equal to about 230 degrees, greater than or equal to about 240 degrees or more, greater than or equal to about 250 degrees or more, greater than or equal to about 260 degrees or more, greater than or equal to about 270 degrees or more, greater than or equal to about 280 degrees or more, etc. Further, for example, the angle may be less than or equal to about 330 degrees, less than or equal to about 310 degrees, less than or equal to about 300 degrees, less than or equal to about 285 degrees, less than or equal to about 275 degrees, less than or equal to about 265 degrees, less than or equal to about 255 degrees, less than or equal to about 245 degrees, less than or equal to about 225 degrees, or less than or equal to about 200 degrees, etc.

The first portion 190 and the second portion 192 may be described as intersecting at an apex 588. Further, the first portion 190 and the second portion 192 may be described as providing, or defining, a chisel edge 587 extending along at least a portion of the blade portion 562. In other words, the apex 588 may define the point, or edge, of the chisel edge 587 of the blade portion 562. The chisel edge 587 may be described as an edge of a blade or knife configured to cut into the ground surface 12. The chisel edge 587 may engage the ground surface 12 prior to the remainder of the ground displacing element 560 when the roller apparatus 540 is engaged with the ground surface 12 as the vehicle traverses the ground.

Figure 9F:
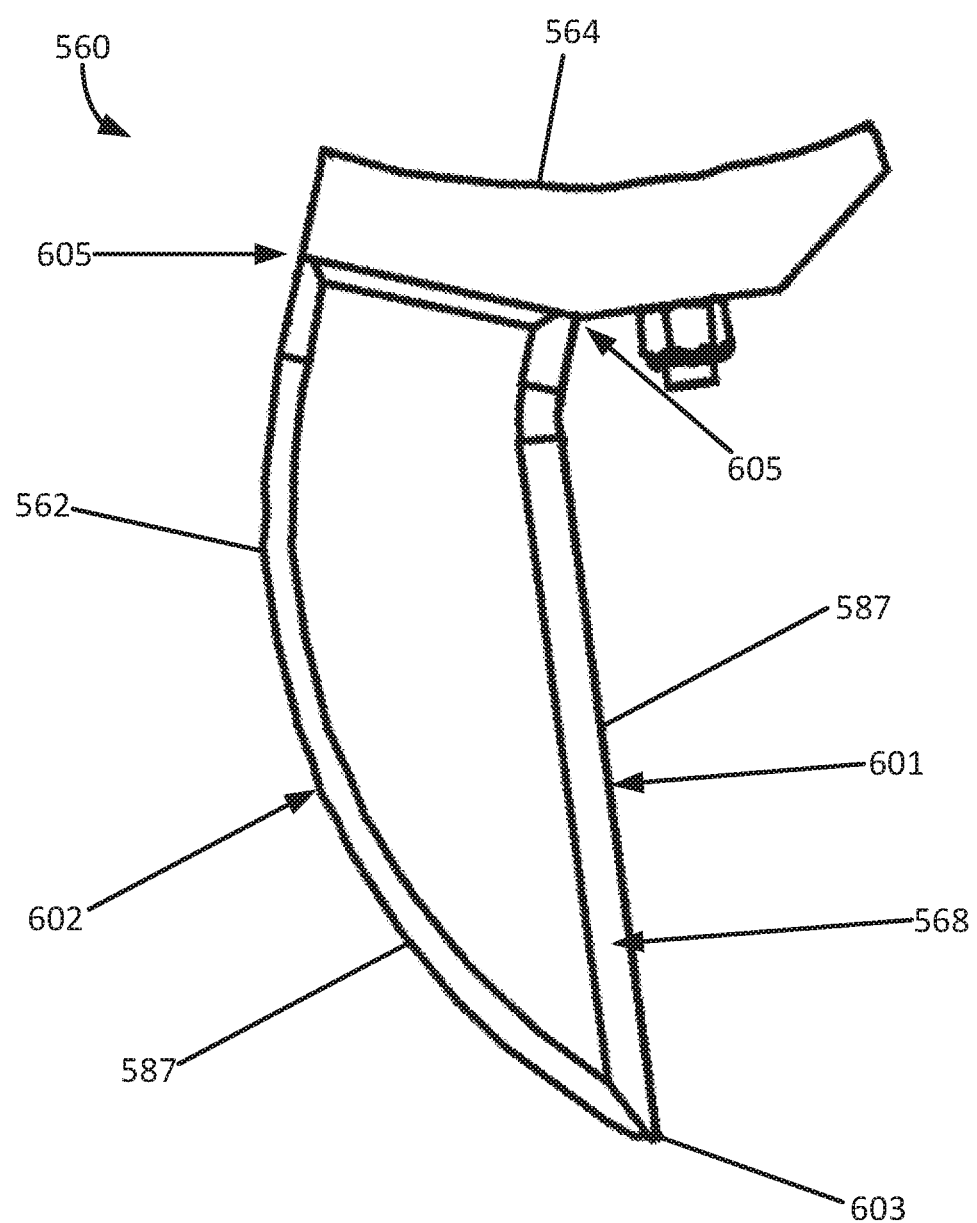
FIG. 9F is an enlarged side view of an exemplary ground displacing element of the roller apparatus of the implement of FIG. 9A.

Further, as shown in FIG. 9F, the chisel edge 587 extend around the perimeter, or at least a portion (e.g., the majority) of the perimeter of the blade portion 562. More specifically, the chisel edge 587 may be described as being included or defined on the forward or leading edge 601 of the blade portion 562 and the rear or trailing edge 602. The forward edge 601 may be further described as being opposite the rearward edge 602 as, e.g., the forward edge 601 may face the direction of rotation while the rearward edge 602 may face opposite the direction of rotation of the cylindrical portion. The chisel edge 587 may be described as extending entirely around the blade portion 562 except for an attachment region 605 where the blade portion 562 is attached, or fixed, to the attachment portion 564. Further, the chisel edge 587 may be described as the first portion or region of the blade portion 562 to enter or contact the ground surface 562 when being used to engage and disperse ground material. Additionally, each of the forward and rearward edges 601 and 602 may meet, or intersect, at a point, or tip, 603 of the blade portion 562. In this embodiment, the rearward edge 602 is curved or defines a curve. In other embodiments, the rearward edge 602 may not be curved, and instead, extend along a linearly line or a mixture of linear and curved. For example, a majority of the rearward edge 602 may be curved while a minority is linear. The curvature of the rearward edge 602 may assist the entering, or engaging, of the ground displacing element 560 into the ground surface. Further, the majority of the forward edge 601 extends linearly (e.g., non-curved) to the point 603. In other embodiments, the forward edge 601 may not be straight, and instead, be at least partially curved.

Figure 9G:
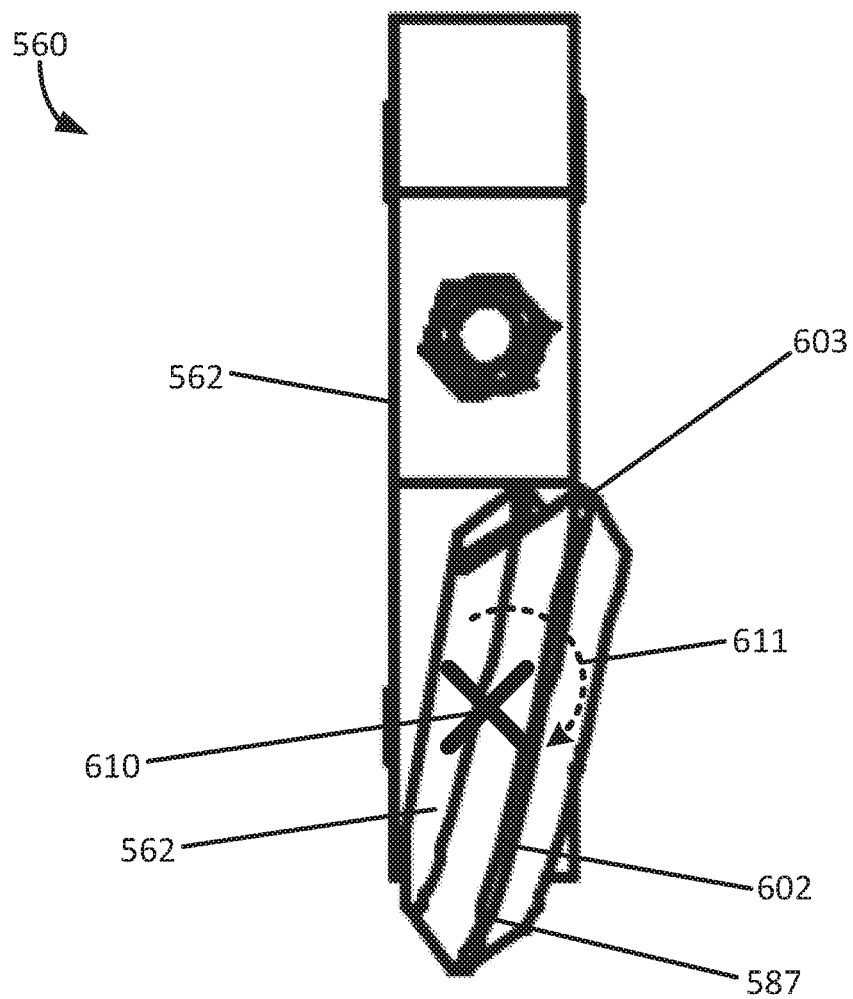
FIG. 9G is an enlarged top view of the ground displacing element of FIG. 9F.

Further, as shown best in FIG. 9G, the blade portions 562 of the ground displacing elements 560 may be described as being tilted or rotated 611 about an axis 610 with respect to the forward moving direction of the implement 510. The axis 610 may extend from the cylindrical portion radially (e.g., perpendicularly to a tangent of the circumference of the cylindrical portion) and the blade portions 562 may be described as being rotated, or angled, 611 about the axis 610 with the forward moving direction being zero degrees. In other words, the blade portions 562 may extend out of a plane lying parallel to the forward moving or rolling direction of the implement 510. For example, a plane parallel to the moving or rolling direction of the implement 510 is represented by dashed line 512 in FIG. 9B proximate one of the ground displacing elements 560. As shown, the blade portion 562 does not substantially lie within the plane represent by dashed line 512 and is, instead, tilted or rotated with respect to the plane. The tilt, or rotation, 611 of the blade portions 562 may assist the blade portions 562 to extend through the ground surface 12 to engage the ground material (e.g., dig, lift, rip, etc. the ground material). Further, as shown, the plurality of ground displacing elements 560 may include blade portions 562 tilted, or rotated, in different (e.g., opposite) directions.

In other words, the blade portions 562 may each being described as lying, or extending, in a plane, and the plane may not be perpendicular (or parallel) to the rolling axis of the cylindrical portion 541. For example, the plane within which the blade portion lies may be considered to be twisted, or angled, from the radial axis, or line, 610, which is perpendicular to the rolling axis of the cylindrical portion 541.

The blade portions 562 of the ground displacing elements 560 may be described as being tilted or rotated 611 about the axis 610 from the forward moving direction between about 0 and about 45 degrees. In one or more embodiments, the blade portions 562 of the ground displacing elements 560 may be described as being tilted or rotated 611 about the axis 610 from the forward moving direction greater than or equal to about 2 degrees, greater than or equal to about 4 degrees, greater than or equal to about 5 degrees, greater than or equal to about 8 degrees, greater than or equal to about 10 degrees, greater than or equal to about 12 degrees, greater than or equal to about 14 degrees, greater than or equal to about 16 degrees, greater than or equal to about 20 degrees, greater than or equal to about 25 degrees, greater than or equal to about 30 degrees, greater than or equal to about 35 degrees, etc. Further, in one or more embodiments, the blade portions 562 of the ground displacing elements 560 may be described as being tilted or rotated 611 about the axis 610 from the forward moving direction less than or equal to about 45 degrees, less than or equal to about 40 degrees, less than or equal to about 38 degrees, less than or equal to about 34 degrees, less than or equal to about 32 degrees, less than or equal to about 27 degrees, less than or equal to about 23 degrees, less than or equal to about 18 degrees, less than or equal to about 13 degrees, less than or equal to about 11 degrees, less than or equal to about 9 degrees, less than or equal to about 7 degrees, less than or equal to about 3 degrees, etc.

Additionally, the ground lifting surface 568 of the blade portion 562 may be described as extending at non-radial angle. For example, substantially all or a majority of the ground lifting surface 568 may not extend along a radial line (e.g., a line that extends through the rolling axis 16 of the cylindrical portion 541). In other words, substantially all or a majority of the ground lifting surface 568 may extend along a dashed line 581 shown in FIG. 9C that does not extend through the rolling axis 16 of the cylindrical portion 541. Further, in other words, substantially all or a majority of the ground lifting surface 568 may extend along a dashed line 581 that does not form a right angle with a tangential line (i.e., a line tangential to outer cylindrical surface 543) where the dashed line 581 enters the outer cylindrical surface 543. Still further, the ground lifting surface 568 may be described as being forward slanted or angled towards the rolling direction of the cylindrical portion 541. More specifically, substantially all or a majority of the ground lifting surface 568 may extend along a dashed line 581 that does forms an acute angle with a tangential line (i.e., a line tangential to outer cylindrical surface 543) where the dashed line 581 enters the outer cylindrical surface 543.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the exemplary apparatus described herein. Various modifications of the illustrative embodiments, as well as additional embodiments of the disclosure, will be apparent upon reference to this description.

What is claimed:

1. An implement system couplable to a vehicle configured to traverse a ground surface, wherein the implement system comprises:

frame apparatus couplable to the vehicle; and
a plurality of roller apparatuses, each coupled to the frame apparatus and comprising:
a cylindrical portion lying along a roller axis configured and dimensioned to roll about the roller axis over a ground surface between crop rows so as to not damage the crop rows, wherein the cylindrical portion defines an outer cylindrical surface configured to engage the ground surface when the cylindrical portion is rolled over the ground surface, and
a plurality of ground displacing elements coupled to the cylindrical portion and extending from the outer cylindrical surface of the cylindrical portion, wherein each ground displacing element of the plurality of ground displacing elements comprises:
an attachment portion removably coupled to the outer cylindrical surface of the cylindrical portion, and
a blade portion coupled to and extending from the attachment portion and configured to extend into the ground surface to displace ground material when the roller apparatus is engaged with the ground surface as the vehicle traverses the ground surface, wherein the blade portion lies in a plane that is not perpendicular to the rolling axis.

2. The system of claim 1, wherein the cylindrical portion of the plurality of roller apparatus extends from a first end portion to a second end portion along the roller axis defining a roller width, wherein the roller width is greater than or equal to 21 inches.

3. The system of claim 1, wherein the cylindrical portion of the plurality of roller apparatus extends from a first end portion to a second end portion along the roller axis, wherein the blade portion of each of the plurality of ground displacing elements defines a forward edge and a rearward edge opposite the forward edge, wherein the forward edge is closer to the first end portion of the cylindrical portion than the rearward edge of at least one ground displacing element, wherein the forward edge is closer to the second end portion of the cylindrical portion than the rearward edge of at least one ground displacing element.

4. The system of claim 1, wherein the cylindrical portion defines a plurality of keyhole-shaped openings through the outer cylindrical surface, wherein the attachment portion of each of the plurality of ground displacing elements is removably coupled to the cylindrical portion using a keyhole-shaped opening of the plurality of keyhole-shaped openings.

5. The system of claim 4, wherein the attachment portion of each of the plurality of ground displacing elements defines an opening extending therethrough, wherein the roller apparatus comprises a plurality of fasteners, and wherein each fastener of the plurality of fasteners is configured to extend through the opening of the attachment portion of a ground displacing element and through a keyhole-shaped opening of the cylindrical portion to couple the ground displacing element to the cylindrical portion.

6. The system of claim 4, wherein the attachment portion of each of the plurality of ground displacing elements is removably coupled to the cylindrical portion using two keyhole-shaped opening of the plurality of keyhole-shaped openings.

7. The system of claim 1, wherein the cylindrical portion of each roller apparatus defines an enclosure configured to contain material to provide additional mass to the roller apparatus.

8. The system of claim 1 further comprising a plurality of extension members coupled to the frame apparatus, wherein each extension member extends from a proximal end portion coupled to the frame apparatus to a distal end portion coupled to a roller apparatus, wherein each extension member is dimensioned travel between crop rows so as to not damage the crop rows.

* * * * *